US010104323B2

(12) United States Patent
Maruyama et al.

(10) Patent No.: US 10,104,323 B2
(45) Date of Patent: Oct. 16, 2018

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Hiroki Maruyama, Hachioji (JP); Manabu Ichikawa, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/706,102

(22) Filed: Sep. 15, 2017

(65) Prior Publication Data
US 2018/0020174 A1    Jan. 18, 2018

Related U.S. Application Data

(63) Continuation of application No. PCT/JP2015/059250, filed on Mar. 25, 2015.

(51) Int. Cl.
*H04N 5/21* (2006.01)
*H04N 5/367* (2011.01)
(Continued)

(52) U.S. Cl.
CPC .............. *H04N 5/367* (2013.01); *G06T 5/002* (2013.01); *G06T 5/20* (2013.01); *H04N 1/409* (2013.01);
(Continued)

(58) Field of Classification Search
CPC ........ H04N 5/367; H04N 5/213; H04N 5/142; H04N 1/409; H04N 5/21; G06T 5/20; G06T 5/002
See application file for complete search history.

(56) References Cited

U.S. PATENT DOCUMENTS

| 8,208,046 B2 | 6/2012 | Ogino |
| 2003/0063203 A1 | 4/2003 | Ohno |

(Continued)

FOREIGN PATENT DOCUMENTS

| JP | 2012-105063 A | 5/2012 |
| JP | 2013-219665 A | 10/2013 |

(Continued)

OTHER PUBLICATIONS

International Search Report dated Jun. 2, 2015 received in International Application No. PCT/JP2015/059250, together with an English-language translation.
Extended Supplementary European Search Report dated Aug. 6, 2018 in European Patent Application No. 15 88 6376.1.

*Primary Examiner* — Hung Lam
(74) *Attorney, Agent, or Firm* — Scully, Scott, Murphy & Presser, P.C.

(57) ABSTRACT

An image processing apparatus performs image processing on image data including blinking defective noise generated by an image sensor including pixels configured to generate a signal, and readout circuits configured to read out the signal as a pixel value. The image processing apparatus includes: an acquisition unit configured to acquire noise information including position information of a pixel in which there is a possibility that blinking defective noise attributed to the readout circuit occurs; a direction determination unit configured to determine, based on the noise information, and pixel values of neighboring pixels surrounding a pixel of interest in an image corresponding to the image data, a direction in which pixel values having highest correlation with a pixel value of the pixel of interest are consecutively arrayed; and an image processor configured to perform image processing on the image data based on a determination result.

15 Claims, 33 Drawing Sheets

(51) Int. Cl.
  *G06T 5/00*   (2006.01)
  *G06T 5/20*   (2006.01)
  *H04N 1/409*  (2006.01)
  *H04N 5/14*   (2006.01)
  *H04N 5/213*  (2006.01)

(52) U.S. Cl.
  CPC ............ *H04N 5/142* (2013.01); *H04N 5/21* (2013.01); *H04N 5/213* (2013.01)

(56) References Cited

U.S. PATENT DOCUMENTS

| | | | |
|---|---|---|---|
| 2009/0324016 A1* | 12/2009 | Ikeda | G01S 3/7864 382/103 |
| 2010/0066868 A1 | 3/2010 | Shohara | |
| 2012/0273655 A1* | 11/2012 | Ise | H04N 5/361 250/208.1 |
| 2014/0270570 A1 | 9/2014 | Litvinov | |
| 2015/0071564 A1 | 3/2015 | Sasaki | |
| 2016/0063681 A1 | 3/2016 | Esaki | |
| 2017/0295329 A1* | 10/2017 | Ichikawa | H04N 1/409 |
| 2017/0302867 A1* | 10/2017 | Ichikawa | H04N 1/409 |

FOREIGN PATENT DOCUMENTS

| | | | |
|---|---|---|---|
| JP | 2014-216775 A | 11/2014 | |
| JP | 2014-225787 A | 12/2014 | |
| WO | 2011/042948 A1 | 4/2011 | |

\* cited by examiner

IMAGE PROCESSING APPARATUS, IMAGE PROCESSING METHOD, AND COMPUTER-READABLE RECORDING MEDIUM

CROSS-REFERENCE TO RELATED APPLICATION

This application is a continuation of PCT international application Ser. No. PCT/JP2015/059250 filed on Mar. 25, 2015 which designates the United States, incorporated herein by reference.

BACKGROUND

The present disclosure relates to an image processing apparatus, an image processing method, and a computer-readable recording medium.

For reducing noise that occurs in image data generated by an image sensor such as a complementary metal oxide semiconductor (CMOS), there has been recently known a technique of reducing noise by determining the direction of an edge based on a pixel value of a pixel of interest in an image corresponding to image data, and pixel values of neighboring pixels surrounding the pixel of interest, and performing noise reduction processing using the determination result (refer to JP 2014-225787 A).

There is a need for an image processing apparatus, an image processing method, and a computer-readable recording medium that may accurately perform direction determination on image data in which blinking defective noise having pixel values varying within a certain range occurs, such as RTS noise.

SUMMARY

An image processing apparatus according to the one aspect of the present disclosure is an image processing apparatus for performing image processing on image data including blinking defective noise that has been generated by an image sensor including pixels arranged in a two-dimensional matrix, the pixels being configured to receive light from outside and to generate a signal according to a light receiving amount, and readout circuits configured to read out the signal as a pixel value, and includes: an acquisition unit configured to acquire noise information including position information of a pixel in which there is a possibility that blinking defective noise attributed to the readout circuit occurs; a direction determination unit configured to determine, based on the noise information acquired by the acquisition unit, and pixel values of neighboring pixels surrounding a pixel of interest in an image corresponding to the image data, a direction in which pixel values having highest correlation with a pixel value of the pixel of interest are consecutively arrayed; and an image processor configured to perform image processing on the image data based on a determination result of the direction determination unit.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

Figures 10A, 10B:
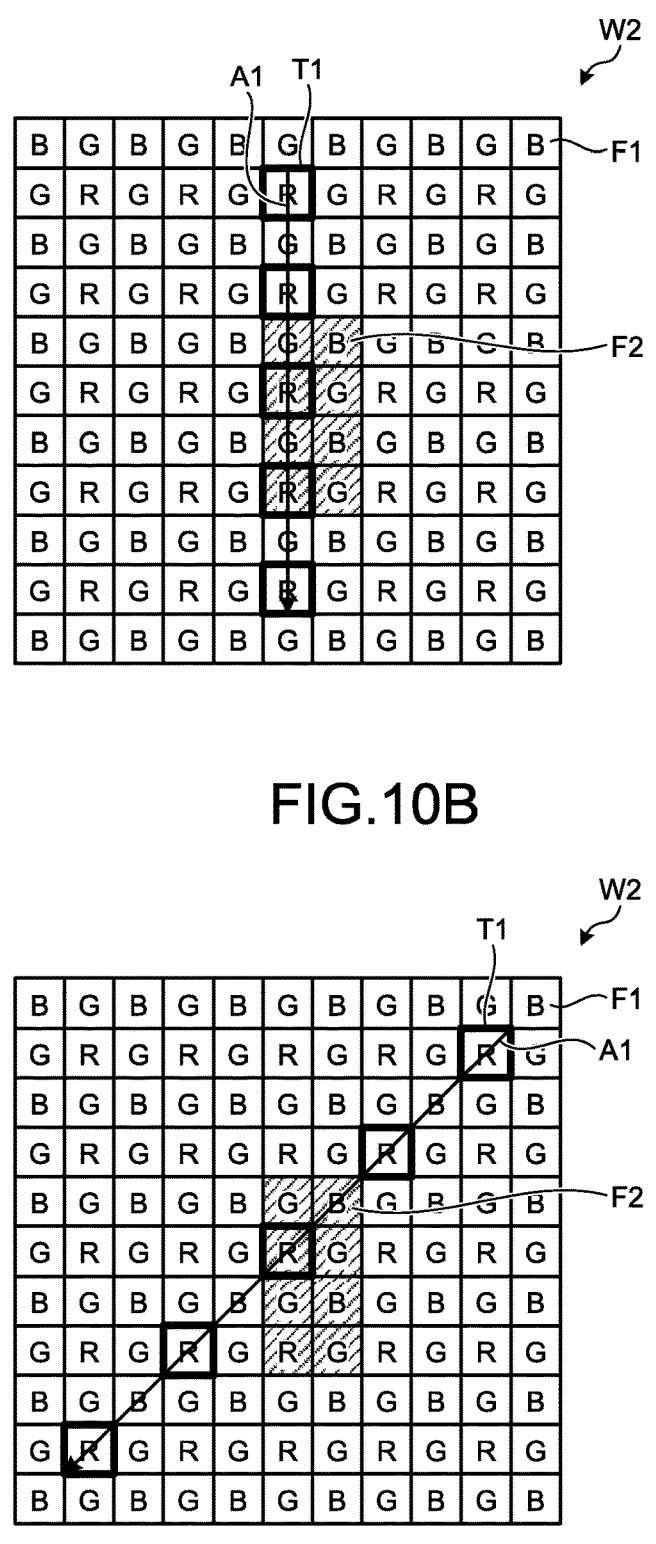
Figures 10C, 10D:
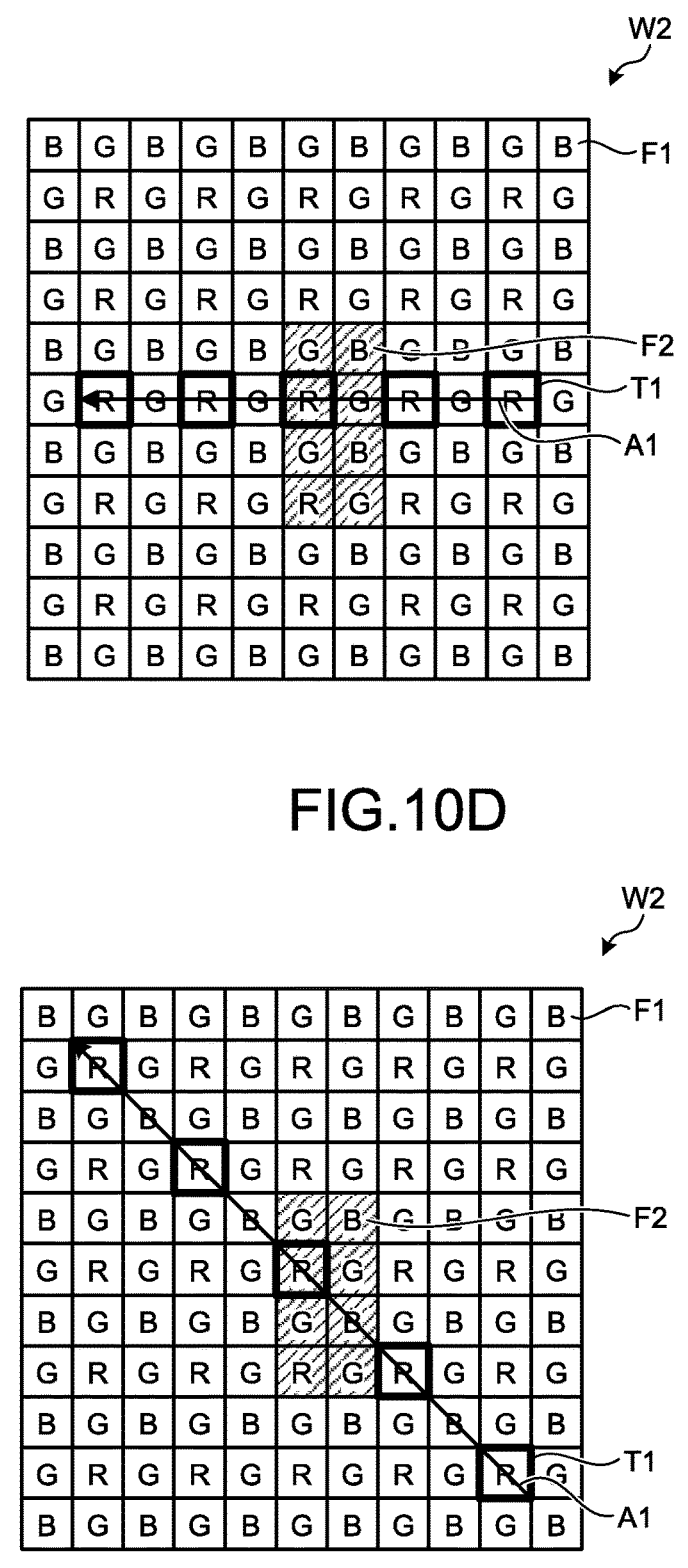

FIG. 10A is a diagram schematically illustrating an example of a direction in which a correlation value calculation unit according to the first modified example of the first embodiment of the present disclosure performs calculation on the image sensor;

FIG. 10B is a diagram schematically illustrating an example of a direction in which the correlation value calculation unit according to the first modified example of the first embodiment of the present disclosure performs calculation on the image sensor;

FIG. 10C is a diagram schematically illustrating an example of a direction in which the correlation value calculation unit according to the first modified example of the first embodiment of the present disclosure performs calculation on the image sensor;

FIG. 10D is a diagram schematically illustrating an example of a direction in which the correlation value calculation unit according to the first modified example of the first embodiment of the present disclosure performs calculation on the image sensor;

Figures 26A, 26B:
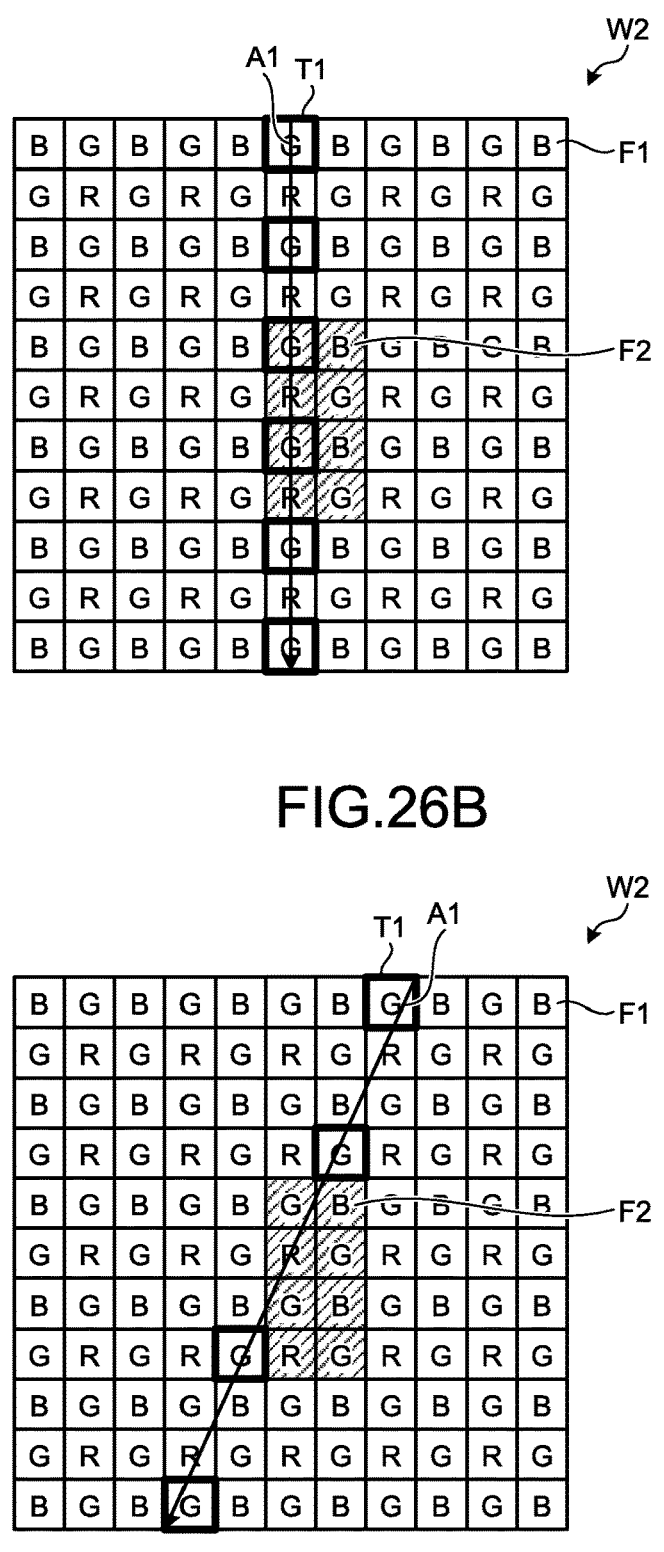
Figures 26C, 26D:
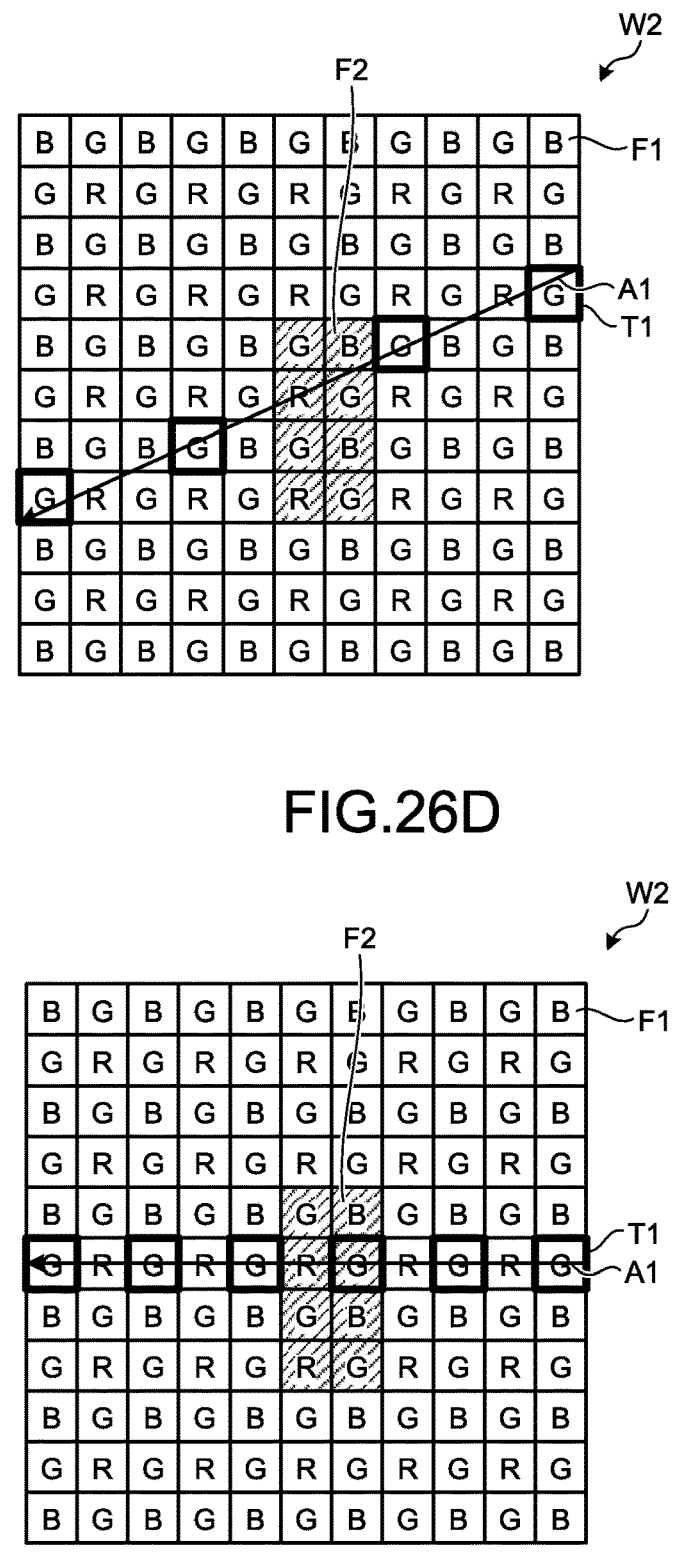
Figures 26E, 26F:
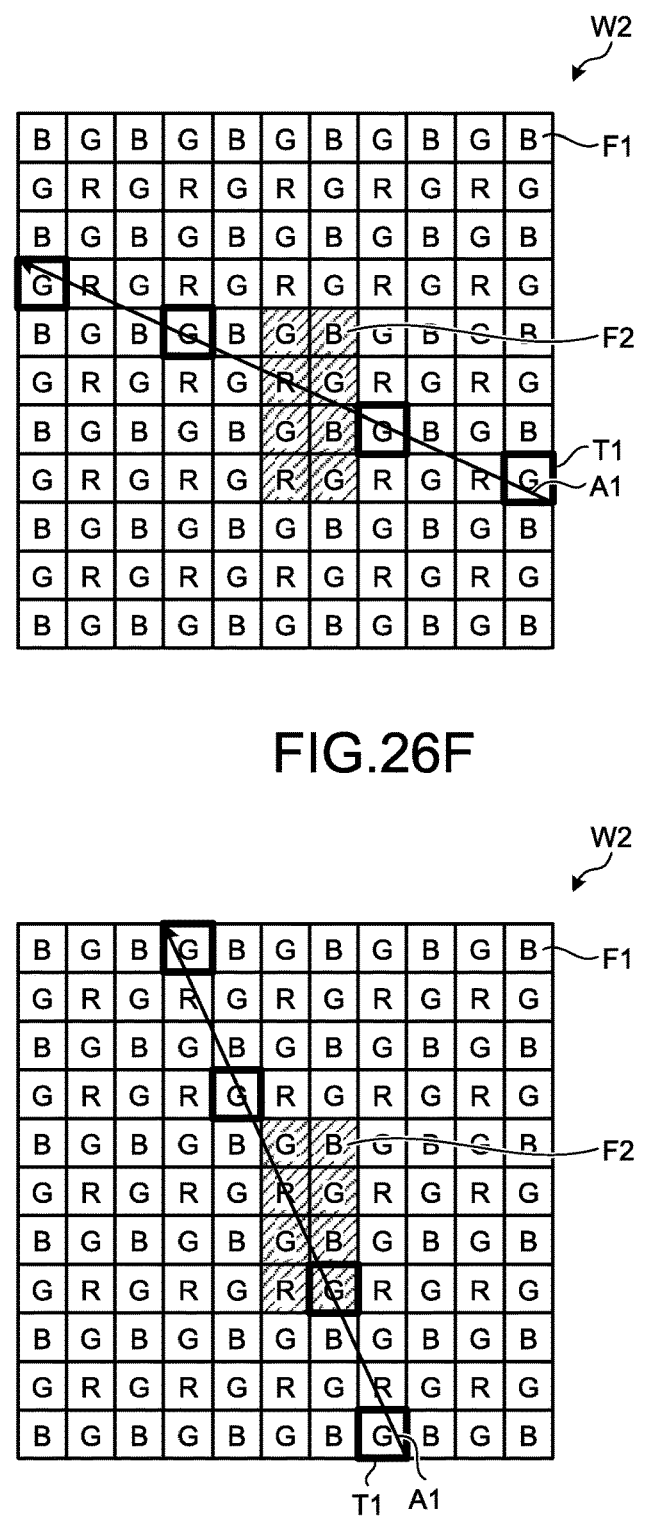

FIG. 26A is a diagram schematically illustrating an example of a direction in which the synchronization processor according to the third embodiment of the present disclosure performs calculation on an image sensor;

FIG. 26B is a diagram schematically illustrating an example of a direction in which the synchronization processor according to the third embodiment of the present disclosure performs calculation on the image sensor;

FIG. 26C is a diagram schematically illustrating an example of a direction in which the synchronization processor according to the third embodiment of the present disclosure performs calculation on the image sensor;

FIG. 26D is a diagram schematically illustrating an example of a direction in which the synchronization processor according to the third embodiment of the present disclosure performs calculation on the image sensor;

FIG. 26E is a diagram schematically illustrating an example of a direction in which the synchronization processor according to the third embodiment of the present disclosure performs calculation on the image sensor;

FIG. 26F is a diagram schematically illustrating an example of a direction in which the synchronization processor according to the third embodiment of the present disclosure performs calculation on the image sensor;

DETAILED DESCRIPTION

A mode for carrying out the present disclosure (hereinafter, referred to as an "embodiment") will be described below with reference to the drawings. In addition, the present disclosure is not limited by embodiments to be described below. Furthermore, in the description of the drawings, the description will be given with the same parts being assigned the same signs.

First Embodiment

Configuration of Imaging System

Figure 1:
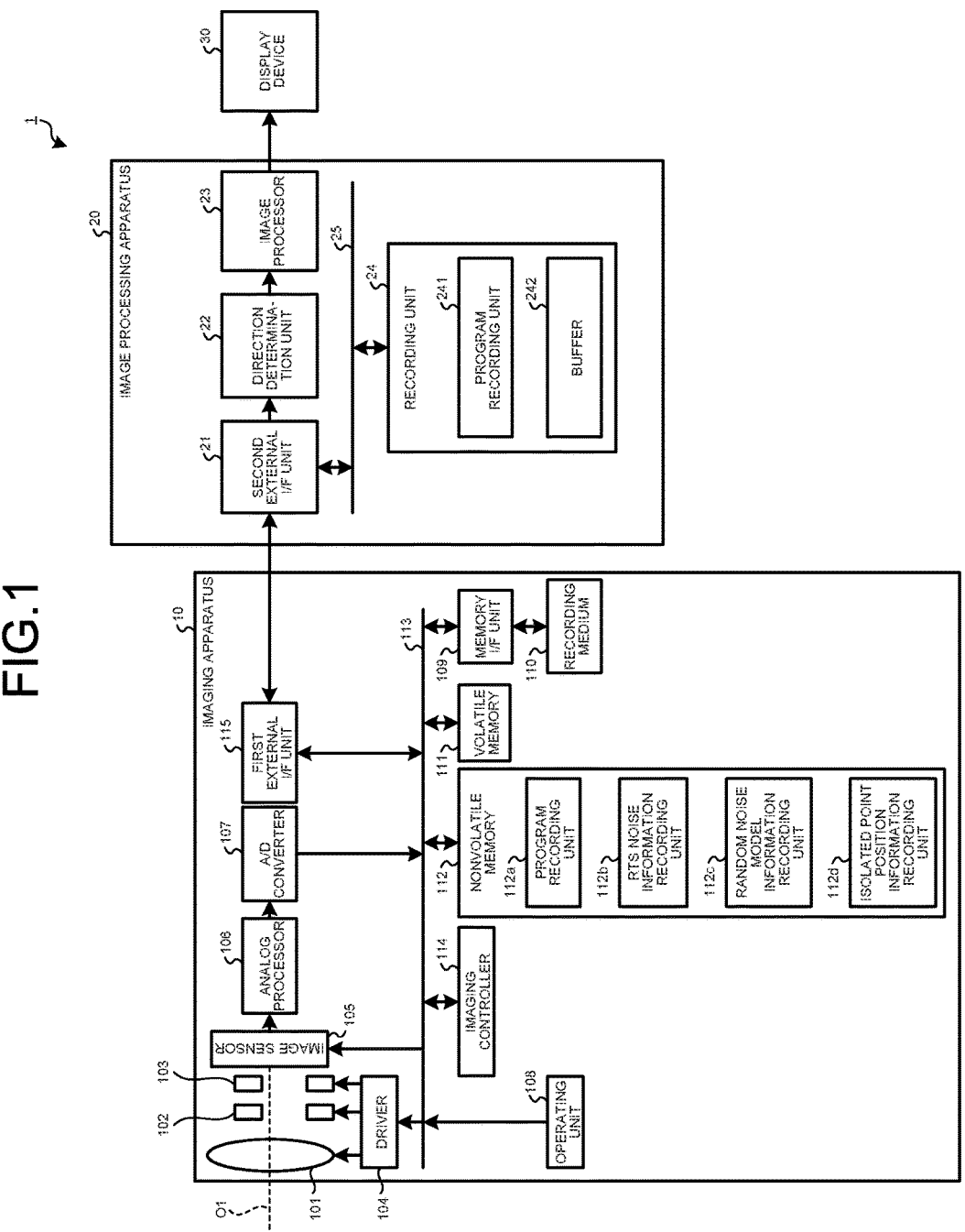
FIG. 1 is a block diagram schematically illustrating a configuration of an imaging system according to a first embodiment of the present disclosure.

FIG. 1 is a block diagram schematically illustrating a configuration of an imaging system according to a first embodiment of the present disclosure. An imaging system 1 illustrated in FIG. 1 includes an imaging apparatus 10, an image processing apparatus 20, and a display device 30.

Configuration of Imaging Apparatus

First of all, a configuration of the imaging apparatus 10 will be described. As illustrated in FIG. 1 the imaging apparatus 10 includes an optical system 101, a diaphragm 102, a shutter 103, a driver 104, an image sensor 105, an analog processor 106, an A/D converter 107, an operating unit 108, a memory I/F unit 109, a recording medium 110, a volatile memory 111, a nonvolatile memory 112, a bus 113, an imaging controller 114, and a first external I/F unit 115.

The optical system 101 is formed by using one or a plurality of lenses. For example, the optical system 101 is formed by using a focus lens and a zoom lens.

The diaphragm 102 adjusts exposure by restricting an entrance amount of light condensed by the optical system 101. The diaphragm 102 restricts an entrance amount of light condensed by the optical system 101, under the control of the imaging controller 114. In addition, an entrance amount of light may be controlled using the shutter 103 or an electrical shutter in the image sensor 105, without using the diaphragm 102. In addition, the optical system 101 and the diaphragm 102 may be detachable from the imaging apparatus 10.

The shutter 103 sets a state of the image sensor 105 to an exposure state or a light-shielded state. For example, the shutter 103 is formed by using a focal plane shutter or the like. In addition, an electrical shutter in the image sensor 105 may be used without using the shutter 103.

Under the control of the imaging controller 114 to be described later, the driver 104 drives the optical system 101, the diaphragm 102, and the shutter 103. For example, by moving the optical system 101 along an optical axis O1, the driver 104 changes a zoom magnification of the imaging apparatus 10 or adjusts a focus position.

Under the control of the imaging controller 114 to be described later, the image sensor 105 receives light condensed by the optical system 101, and converts the light into image data (electrical signal) to output the image data. The image sensor 105 is formed by using a complementary metal oxide semiconductor (CMOS) including a plurality of pixels arranged in a two-dimensional matrix, or the like. An ROB filter having a Bayer array is arranged on the front surface of each of the pixels. In addition, the image sensor 105 is not limited to the Bayer array, and may of course have a stacked form such as Fovion, for example. In addition, a filter to be used is not limited to the ROB filter, and any filter such as a complementary filter may be applied. In addition, a light source that may emit light having different colors, in a time-division manner may be additionally disposed without disposing a filter on the image sensor 105, and the image sensor 105 may be configured to be able to form a color image using images sequentially captured while changing colors to be emitted. Furthermore, the image sensor 105 may be configured to be able to form a monochrome image without disposing a filter. In addition, the image sensor 105 has an electrical shutter function that may electrically control a light receiving amount.

Figure 2:
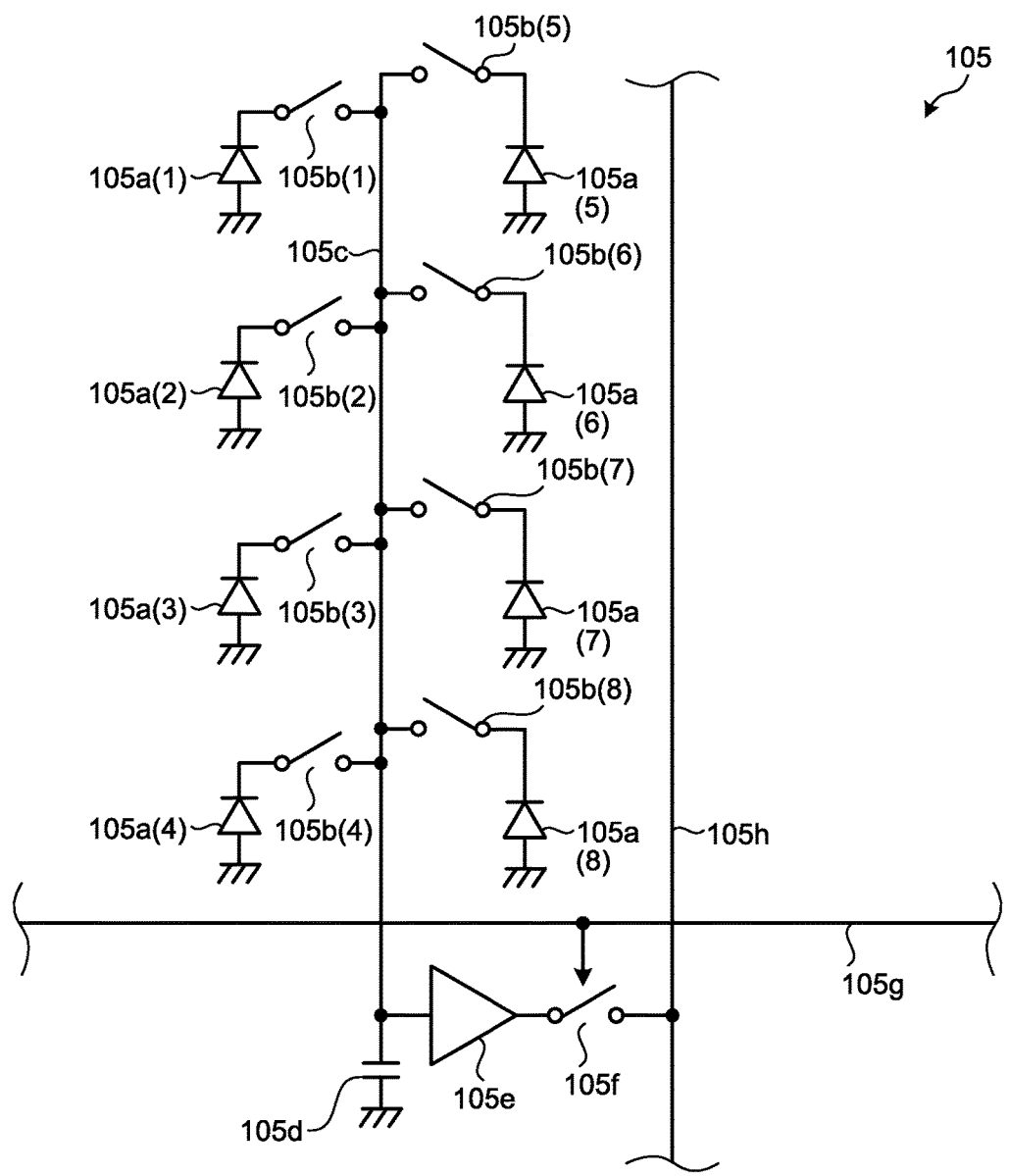
FIG. 2 is a schematic diagram schematically illustrating a configuration of a main part of an image sensor of the imaging system according to the first embodiment of the present disclosure.

Here, a configuration of the image sensor 105 will be described in detail. FIG. 2 is a schematic diagram schematically illustrating a configuration of a main part of the image sensor 105. In addition, FIG. 2 illustrates an example of the image sensor 105 in which a readout circuit is shared by a plurality of pixels for enhancing sensitivity by increasing an aperture ratio of the pixels. In addition, in the image sensor 105 illustrated in FIG. 2, one readout circuit is disposed for eight pixels including two pixels in a horizontal direction (traverse direction)×four pixels in a vertical direction (longitudinal direction). In addition, in FIG. 2, the description has been given of an example in which one group includes one readout circuit for eight pixels including two pixels in the horizontal direction (traverse direction)×four pixels in the vertical direction (longitudinal direction). Nevertheless, it is assumed that the aforementioned pixels and the readout circuits are consecutively arranged in the horizontal direction and the vertical direction on the image sensor 105 of this first embodiment.

As illustrated in FIG. 2, the image sensor 105 includes a plurality of pixels 105a (photodiodes) that generates electrical charge corresponding to an exposure amount by receiving light through exposure and performing photoelectric conversion, first switches 105b that are respectively provided for the plurality of pixels 105a, and open and close according to the control of the imaging controller 114, a vertical transfer line 105c that transfers a signal (electrical charge) output from each of the plurality of pixels 105a, in the vertical direction, a floating diffusion (FD) unit 105d that accumulates signals respectively output from the plurality of pixels 105a, an amplifier unit 105e that amplifies the signals output from the FD unit 105d, a second switch 105f that opens and closes according to the control of the imaging controller 114, a control line 105g that controls the second switch 105f, and a transfer line 105h that transfers electrical signals amplified by the amplifier unit 105e.

When reading out signals corresponding to exposure amounts in the pixels 105a (1) to 105a (8), as pixel values, the image sensor 105 having the above-described configuration first sets the FD unit 105d to a reset state, and the imaging controller 114 turns on only the first switch 105b (1). The image sensor 105 thereby transfers electrical charge generated in the pixel 105a (1), to the FD unit 105d. After that, by the imaging controller 114 turning on the second switch 105f, the image sensor 105 causes the amplifier unit 105e to amplify electrical charges accumulated in the FD unit 105d, and reads out (outputs) the electrical charges as pixel values. Next, by setting the FD unit 105d to the reset state, and the imaging controller 114 turning on only the first switch 105b (2), the image sensor 105 transfers electrical charge generated in the pixel 105a (2), to the FD unit 105d. After that, by the imaging controller 111 turning on the second switch 105f, the image sensor 105 causes the amplifier unit 105e to amplify electrical charges accumulated in the FD unit 105d, and reads out the electrical charges as pixel values. By sequentially performing such a readout operation, the image sensor 105 may sequentially output signals corresponding to exposure amounts in the pixels 105a (1) to 105a (8), as pixel values. In addition, in this first embodiment, the amplifier unit 105e functions as a readout circuit that reads out electrical charge from each of the plurality of pixels 105a.

Referring back to FIG. 1, the description of the configuration of the imaging apparatus 10 will be continued.

The analog processor 106 performs predetermined analog processing on an analog signal input from the image sensor 105, and outputs the signal to the A/D converter 107. More specifically, the analog processor 106 performs noise reduction processing, gain-up processing, and the like on the analog signal input from the image sensor 105. For example, with respect to the analog signal, the analog processor 106 reduces reset noise or the like, and then performs waveform shaping, and furthermore, performs gain-up so as to have target brightness.

By performing A/D conversion on the analog signal input from the analog processor 106, the A/D converter 107 generates digital image data (hereinafter, referred to as "RAW image data"), and outputs the image data to the volatile memory 111 via the bus 113. In addition, the A/D converter 107 may directly output the RAW image data to each unit of the imaging apparatus 10 that is to be described later. In addition, the aforementioned analog processor 106 and the A/D converter 107 may be provided in the image sensor 105, and the image sensor 105 may directly output the digital RAW image data.

The operating unit 108 issues various instructions of the imaging apparatus 10. More specifically, the operating unit 108 includes a power switch that switches a power state of the imaging apparatus 10 to an on state or an off state, a release switch that issues a still image capturing instruction, an operating switch that switches various settings of the imaging apparatus 10, a moving image switch that issues a moving image capturing instruction, and the like.

The recording medium 110 is formed by using a memory card attached from the outside of the imaging apparatus 10, and is detachably attached to the imaging apparatus 10 via the memory I/F unit 109. In addition, the recording medium 110 may output programs and various types of information to the nonvolatile memory 112 via the memory I/F unit 109 under the control of the imaging controller 114.

The volatile memory 111 temporarily stores image data input from the A/D converter 107 via the bus 113. For example, the volatile memory 111 temporarily stores image data sequentially output by the image sensor 105 for one frame, via the analog processor 106, the A/C converter 107, and the bus 113. The volatile memory 111 is formed by using a synchronous dynamic random access memory (SCRAM) or the like.

The nonvolatile memory 112 is formed by using a flash memory or the like, and records various programs for operating the imaging apparatus 10, and various types of data used in the execution of the programs. In addition, the nonvolatile memory 112 includes a program recording unit 112a, an RTS noise information recording unit 112b that records RTS noise position information in which position information of the readout circuit (the amplifier unit 105e) that reads out pixel values, or position information of each of the plurality of pixels 105a, and feature data related to RTS noise attributed to the readout circuit (the amplifier unit 105e) are associated, a random noise model information recording unit 112c that records one or a plurality of random noise models, and an isolated point position information recording unit 112d that records isolated point position information indicating positions of a plurality of isolated point pixels. Here, the feature data is any of amplitude (RTS_Value) of RTS noise, occurrence frequency of blinking defective noise, and occurrence frequency of RTS noise smaller than the amplitude of RTS noise.

The bus 113 is formed by using a transmission path or the like that connects components of the imaging apparatus 10, and transfers various types of data generated in the imaging apparatus 10, to each component of the imaging apparatus 10.

The imaging controller 114 is formed by using a central processing unit (CPU) or the like, and comprehensively controls the operation of the imaging apparatus 10 by, for example, issuing instructions and transferring data to the units constituting the imaging apparatus 10, according to instruction signals and release signals from the operating unit 108. For example, when a second release signal is input from the operating unit 108, the imaging controller 114 starts control of a capturing operation in the imaging apparatus 10. Here, the capturing operation in the imaging apparatus 10 refers to an exposure timing of the image sensor 105, an output timing of an analog signal, and an operation of the analog processor 106 and the A/D converter 107 performing predetermined processing on an analog signal output by the image sensor 105. The image data having been subjected to the processing is recorded on the recording medium 110 via the bus 113 and the memory I/F unit 109 under the control of the imaging controller 114.

The first external I/F unit 115 outputs information input from an external device via the bus 113, to the nonvolatile memory 112 or the volatile memory 111, and outputs information recorded in the volatile memory 111, information recorded in the nonvolatile memory 112, and image data generated by the image sensor 105, to the external device via the bus 113. More specifically, the first external I/F unit 115 outputs, via the bus 113, image data generated by the image sensor 105, RTS noise information, and random noise model information to the image processing apparatus 20.

Configuration of Image Processing Apparatus

Next, a configuration of the image processing apparatus 20 be described. The image processing apparatus 20 includes a second external I/F unit 21, a direction determination unit 22, an image processor 23, a recording unit 24, and a bus 25.

The second external I/F unit 21 acquires, via the first external I/F unit 115 and the bus 113 of the imaging apparatus 10, the RAW image data generated by the image sensor 105, RTS noise information related to RTS noise that is recorded in the RTS noise information recording unit 112b, isolated point position information recorded in the isolated point position information recording unit 112d, and random noise model information recorded in the random noise model information recording unit 112c, and outputs the RAW image data, the RTS noise information, the isolated point position information, and the random noise model information that have been acquired via the bus 25, to the direction determination unit 22 and the recording unit 24. The second external I/F unit 21 and the first external I/F unit 115 are connected via, for example, a control cable, wireless communication, or the like that enables interactive communication of information. In addition, in this first embodiment, the second external I/F unit 21 functions as an acquisition unit.

Figure 3:
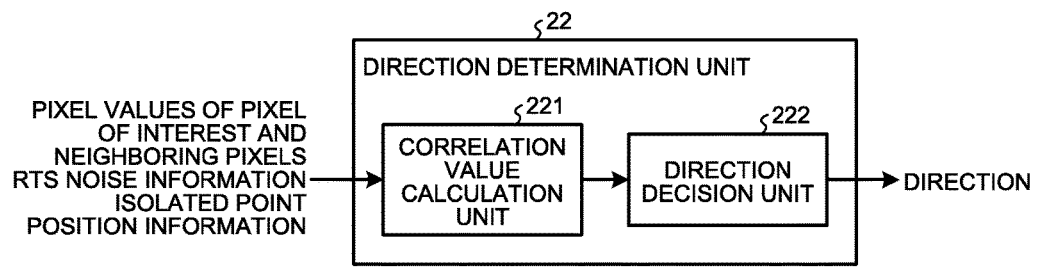
FIG. 3 is a block diagram illustrating a functional configuration of a direction determination unit illustrated in FIG. 1.

The direction determination unit 22 acquires, via the second external I/F unit 21, the first external I/F unit 115, and the bus 113, a pixel value of a pixel of interest in a RAW image corresponding to the RAW image data, pixel values of neighboring pixels surrounding the pixel of interest, the RTS noise information, and the isolated point position information, and determines a direction in which pixel values having the highest correlation with the pixel value of the pixel of interest are consecutively arrayed, based on the acquired RTS noise information and the pixel values of the neighboring pixels surrounding the pixel of interest in the RAW image corresponding to the RAW image data. Here, a detailed configuration of the direction determination unit 22 will be described. FIG. 3 is a block diagram illustrating a functional configuration of the direction determination unit 22. The direction determination unit 22 includes a correlation value calculation unit 221 and a direction decision unit 222.

The correlation value calculation unit 221 calculates correlation values of a pixel value of a pixel of interest in each direction in the RAW image generated by the image sensor 105, and pixel values of neighboring pixels of the pixel of interest. Here, the correlation values are values indicating the degree of similarity between the pixel value of the pixel of interest and the pixel values of the neighboring pixels, and values that are based on differences between the pixel value of the pixel of interest and the pixel values of the neighboring pixels, for example.

The direction decision unit 222 decides a direction in which correlation is the highest, based on the correlation values of the respective directions that have been calculated by the correlation value calculation unit 221. For example, when differences between the pixel value of the pixel of interest and the pixel values of the neighboring pixels are used as the correlation values, a direction in which the differences become the smallest is decided.

Referring back to FIG. 1, the description of the configuration of the image processing apparatus 20 will be continued.

Based on a determination result of the direction determination unit 22, the image processor 23 performs predetermined image processing on the image data, and outputs the image data to the display device 30. Here, as the predetermined image processing, basic image processing is performed including at least optical black reduction processing and white balance adjustment processing, and including synchronization processing of image data, color matrix calculation processing, γ-correction processing, color reproduction processing, edge enhancement processing, noise reduction processing, and the like when the image sensor 105 has the Bayer array. In addition, the image processor 23 performs image processing for reproducing a natural image, based on preset parameters of each type of image processing. Here, the parameters of each type of image processing include values of contrast, sharpness, saturation, white balance, and gradation.

The recording unit 24 is formed by using a volatile memory and a nonvolatile memory, and records various programs for operating the image processing apparatus 20, and various types of data used in the execution of the programs. In addition, the recording unit 24 includes a program recording unit 241 for driving the image processing apparatus 20, and a buffer 242 that temporarily stores the RAW image data, the RTS noise information, the isolated point position information, edge variables of a pixel of interest, evaluation values, and the like that have been input from the imaging apparatus 10 via the second external I/F unit 21 and the bus 25.

The bus 25 is formed by using a transmission path or the like that connects components of the image processing apparatus 20, and transfers various types of data generated in the image processing apparatus 20, to each component of the image processing apparatus 20.

Configuration of Display Device

Next, a configuration of the display device 30 will be described. The display device 30 displays an image corresponding to image data input from the image processing apparatus 20. The display device 30 is formed by using a display panel or the like having a liquid crystal, organic Electro Luminescence (EL), or the like.

In the imaging system 1 having the above-described configuration, after the image processing apparatus 20 has performed edge direction determination on image data generated by the image sensor 105, the image processing apparatus 20 performs image processing based on the result of the direction determination, and the display device 30 displays an image corresponding to the image data on which image processing has been performed by the image processing apparatus 20. In addition, the image data on which image processing has been performed by the image processing apparatus 20 may be recorded in the recording medium 110 or the nonvolatile memory 112 of the imaging apparatus 10 via the second external I/F unit 21, the first external I/F unit 115, and the bus 113.

Occurrence Cause and Property of RTS Noise

Next, the occurrence cause of RTS noise and the property of RTS noise will be described.

Figure 4:
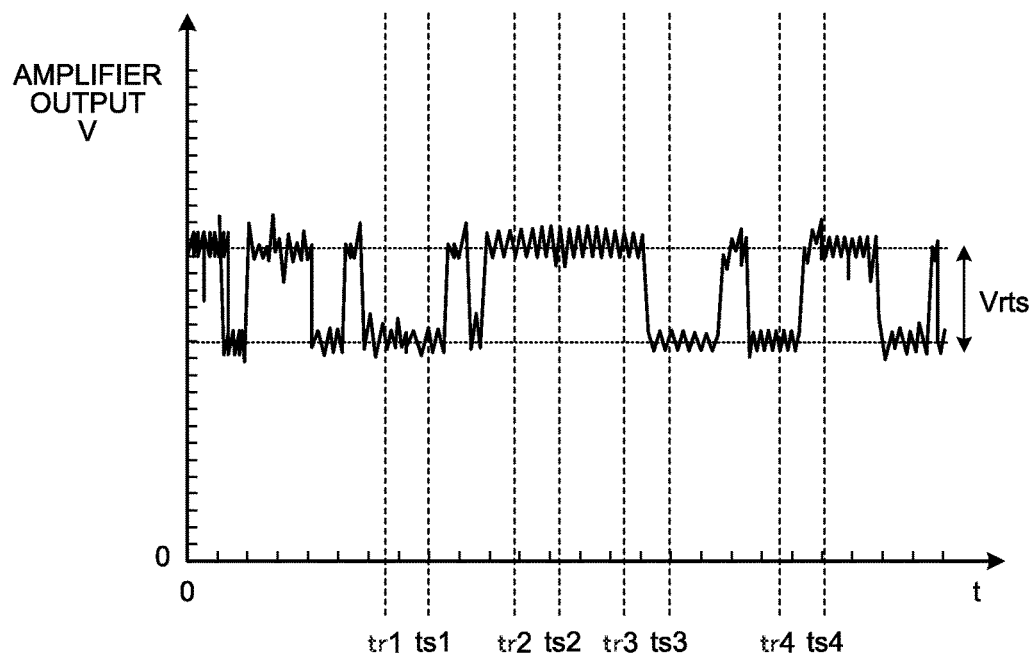
FIG. 4 is a diagram illustrating an example of variations in amplifier output that is output from an amplifier unit when RTS noise occurs, in a case in which the image sensor of the imaging system according to the first embodiment of the present disclosure is shielded from light so that light is not emitted onto the image sensor.
Figure 5:
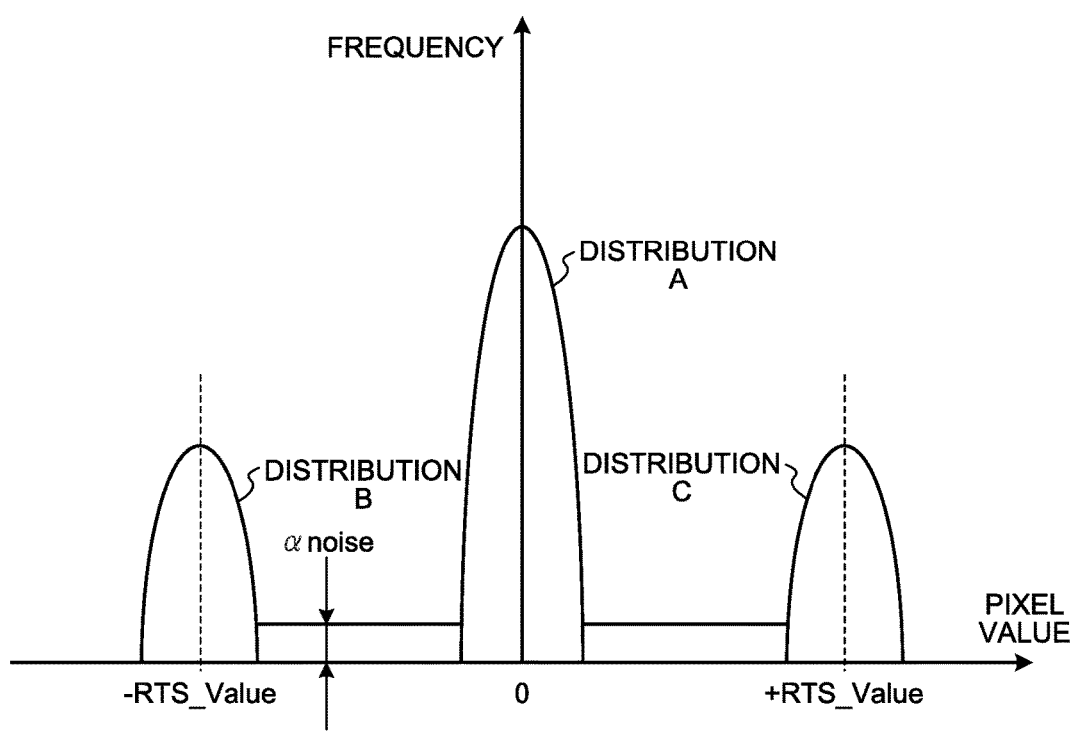
FIG. 5 is a diagram illustrating an example of distributions of pixel values read out using an amplifier unit in which RTS noise occurs.

FIG. 4 is a diagram illustrating an example of variations in amplifier output that is output from the amplifier unit 105e when RTS noise occurs, in a case in which the image sensor 105 is shielded from light so that light is not emitted onto the image sensor 105. FIG. 5 is a diagram illustrating an example of distributions of pixel values read out using the amplifier unit 105e in which RTS noise occurs.

If there is a trap level in a gate oxide film in the amplifier unit 105e, electrical charges are trapped in or discharged to the trap level at random timing, and RTS noise accordingly occurs. Thus, as illustrated in FIG. 4, in the amplifier unit 105e in which RTS noise occurs, an amplifier output varies at random within a range of about Vrts. In addition, a variation in electrical potential occurs not instantly, and requires small amount of time.

In the image sensor 105, correlated double sampling processing (hereinafter, referred to as "CDS processing") is generally performed for reducing noise from a pixel value read out from the pixel 105a. In the CDS processing, the imaging controller 114 turns on a reset switch (not illustrated) of the image sensor 105 to reset electrical charges in the FD unit 105d, and furthermore, the imaging controller 114 turns on the second switch 105f to cause the reset state, and reads out (outputs) a signal in the reset state (reference signal). Next, in the CDS processing, the imaging controller 114 turns on only the first switch 105b (or any of the first switches 105b (1) to 105b (8)), transfers electrical charge generated in the pixel 105a, to the FD unit 105d, and furthermore, causes a readout state (output state) in which the second switch 105f is turned on, and reads out (outputs) a signal in the readout state. Subsequently, in the CDS processing, a signal obtained by subtracting the signal in the reset state (reference signal) from the signal in the readout state is converted as a pixel value.

As illustrated in FIG. 4, when the image sensor 105 reads out signals at a time tr1 (reset state) and a time ts1 (readout state) through the CDS processing, because respective amplifier outputs V at the time tr1 and the time ts1 are substantially equal, influence is exerted mainly by random noise, and read-out pixel values have a distribution centered on 0, like a distribution A illustrated in FIG. 5. Similarly, because respective amplifier outputs V at a time tr2 and a time ts2 are substantially equal also at the time tr2 (reset state) and the time ts2 (readout state), pixel values read out by the image sensor 105 have the distribution A illustrated in FIG. 5.

On the other hand, when the image sensor 105 reads out signals at a time tr3 (reset state) and a time ts3 (readout state) through the CDS processing, an amplifier output at the time ts3 is lower by about Vrts as compared with an amplifier output at the time tr3. Thus, if a difference between the two signals is calculated, a distribution shifts in a negative direction by an amount corresponding to RTS_Value, which is a pixel value corresponding to Vrts being a change amount of amplifier outputs, so that read-out pixel values have a distribution B centered on −RTS_Value.

In contrast to this, when the image sensor 105 reads out signals at a time tr4 (reset state) and a time ts4 (readout state) through the CDS processing, an amplifier output at the time ts4 is higher by about Vrts as compared with an amplifier output at the time tr4. Thus, if a difference between the two signals is calculated, a distribution shifts in a positive direction by an amount corresponding to RTS_Value, which is a pixel value corresponding to Vrts being a change amount of amplifier outputs, so that read-out pixel values have a distribution C centered on +RTS_Value.

Here, because the occurrence of a variation in amplifier output in FIG. 4 requires a time τ, a signal is sometimes read out while electrical potential is varying. In this case, an amplifier output difference between a readout time in the reset state and a readout time in the readout state is larger than −Vrts and smaller than Vrts. As a result, pixel values read out from the image sensor 105 have values larger than −RTS_Value and smaller than RTS_Value. The time τ is considered to be substantially constant if conditions of the image sensor 105 (e.g., temperature, driving voltage, etc.) are constant. Thus, a pixel value larger than −RTS_Value and smaller than RTS_Value occurs with similar probability. Here, the occurrence frequency of these pixel values is defined as αnoise. In addition, the distribution B and the distribution C are similar distributions except that median values are different. Thus, in the following description, a ratio of the distribution B or the distribution C to the distribution A is defined as αrts. The αrts becomes larger as an amplifier output variation cycle of the amplifier unit 105e becomes shorter.

In this manner, through the CDS processing, pixel values read out using the amplifier unit 105e in which RTS noise occurs have distributions as illustrated in FIG. 5. In addition, in the condition in which light is emitted onto the image sensor 105, electrical potential in the readout state varies according to an exposure amount. Nevertheless, a change in electrical potential that is caused by RTS noise is constant regardless of an exposure amount. In other words, RTS noise does not depend on an exposure amount, and has a property of varying at random with respect to a normal pixel value within a range equal to or larger than −RTS_Value and equal to or smaller than $RTS_{13}$ Value. In addition, in FIG. 5, the distribution A, the distribution B, and the distribution C are schematically illustrated. Nevertheless, a normal distribution is generally obtained.

In addition, because RTS noise is noise attributed to the readout circuit (the amplifier unit 105e), when one readout circuit is shared by the plurality of pixels 105a as illustrated in FIG. 2, RTS noise having similar properties occur in all the sharing pixels (the pixels 105a (1) to 105a (8)).

In addition, aside from the readout circuit (the amplifier unit 105e) illustrated in FIG. 2, RTS noise sometimes occurs in a column amplifier, a source follower, and the like that is shared in a column direction of the image sensor 105. In this case, RTS noise having similar properties occurs in all pixels in the column direction that share the same column amplifier and the source follower. In the present embodiment, the present disclosure may be applied to RTS noise that occurs in circuits other than the readout circuit (the amplifier unit 105e).

In this manner, RTS noise is a type of blinking defective noise that occurs in such a manner that, when an image of a subject is fixedly captured in the same condition, a pixel value in the captured image is amplified (varies) within a certain range (equal to or larger than −RTS_Value and equal to or smaller than RTS_Value).

Processing of Direction Determination Unit

Figure 6:
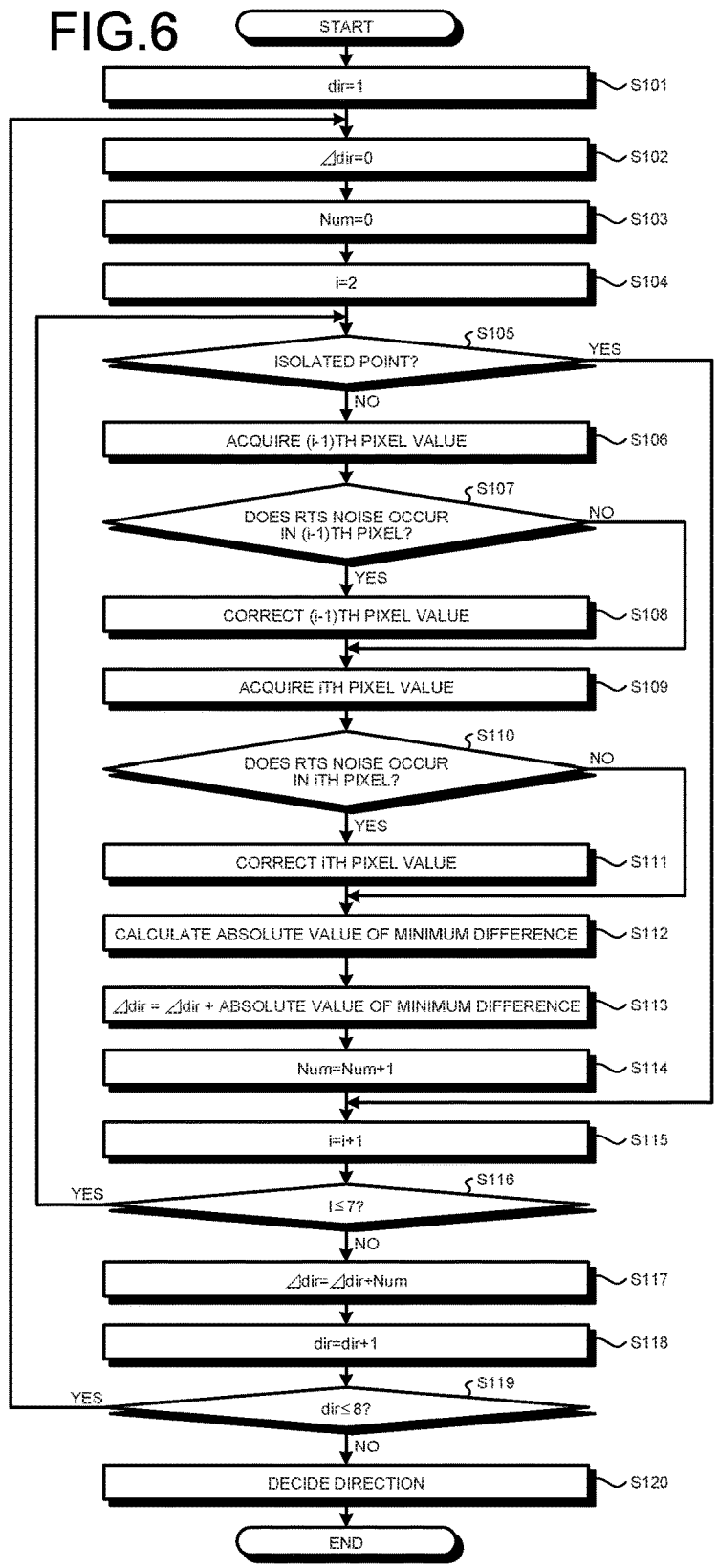
FIG. 6 is a flowchart illustrating overview of processing executed by the direction determination unit according to the first embodiment of the present disclosure.

Next, processing executed by the direction determination unit 22 will be described. FIG. 6 is a flowchart illustrating overview of processing executed by the direction determination unit 22, and is a flowchart illustrating overview of direction determination processing of determining a direction.

As illustrated in FIG. 6, the correlation value calculation unit 221 first initializes a variable dir indicating a direction in which a correlation degree is to be calculated (dir=1)(step S101).

Figure 7:
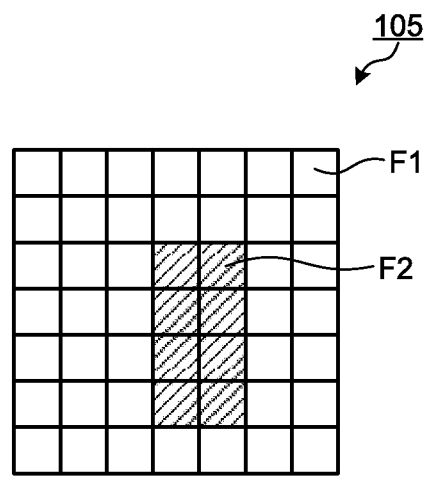
FIG. 7 is a diagram schematically illustrating a pixel array of the image sensor of the imaging system according to the first embodiment of the present disclosure.

FIG. 7 is a diagram schematically illustrating a pixel array of the image sensor 105, and is a diagram illustrating a pixel array of the image sensor 105 having no color filter (monochrome image sensor). FIGS. 8A to 8H are diagrams each schematically illustrating an example of a direction in which the correlation value calculation unit 221 performs calculation on a RAW image, and a direction indicated by a dir 1 corresponds to FIG. 8A, a direction indicated by a dir 2 corresponds to FIG. 8B, and so on, and a direction indicated by a dir 8 corresponds to FIG. 8H. In FIGS. 7 and 8A to 8H, a pixel F1 indicates a normal pixel (not hatched), and a pixel F2 indicates a pixel (hatched) in which there is a possibility that RTS noise occurs, a thick frame T1 indicates pixels used for direction determination, and an arrow A1 indicates a direction. In addition, in FIGS. 8A to 8H, a pixel corresponding to a start point of the arrow A1 is defined as the first pixel, the next pixel on the arrow A1 is defined as the second pixel, and so on, and a pixel corresponding to an end point of the arrow A1 (distal end of the arrow) is defined as the seventh pixel. As illustrated in FIGS. 8A to 8H, in this first embodiment, the correlation value calculation unit 221 calculates correlation values in eight directions on a RAW image W1. Thus, in this first embodiment, a number indicated by dir is assumed to be equal to or larger than 1 and equal to or smaller than 8.

Subsequently, the correlation value calculation unit 221 initializes a variable Δdir indicating a correlation degree in a dir direction, to 0 (Δdir=0) (step S102), initializes a counter that counts the number added to Δdir, to 0 (Num=0) (step S103), and initializes a counter i indicating a position at which a correlation degree is to be obtained (i=2) (step S104).

After that, the correlation value calculation unit 221 acquires, via the second external I/F unit 21, the first external I/F unit 115, and the bus 113, the isolated point position information from the isolated point position information recording unit 112d, and a RAW image from the volatile memory 111, and determines, based on the acquired isolated point position information, whether an ith pixel or an (i−1)th pixel in the RAW image is an isolated point pixel (step S105). Here, the ith pixel is the ith pixel on the arrow A1 extending in the dir direction that is obtained when a pixel of interest in the RAW image is located at the center, and the (i−1)th pixel is the (i−1)th pixel (pixel shifted by one pixel toward a start point side along the arrow A1 extending in the dir direction) on the arrow A1 extending in the dir direction that is obtained when the pixel of interest is located at the center. When the correlation value calculation unit 221 determines that the ith pixel or the (i−1)th pixel in the RAW image is an isolated point pixel (step S105: Yes), the direction determination unit 22 advances the processing to step S115 to be described later. In contrast to this, when the correlation value calculation unit 221 determines that the ith pixel or the (i−1)th pixel in the RAW image is not an isolated point pixel (step S105: No), the direction determination unit 22 advances the processing to step S106 to be described later.

Figure 8A:
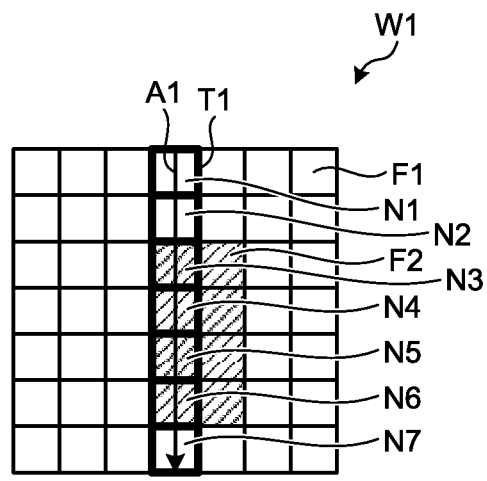
FIG. 8A is a diagram schematically illustrating an example of a direction in which a correlation value calculation unit according to the first embodiment of the present disclosure performs calculation on the image sensor.
Figure 8B:
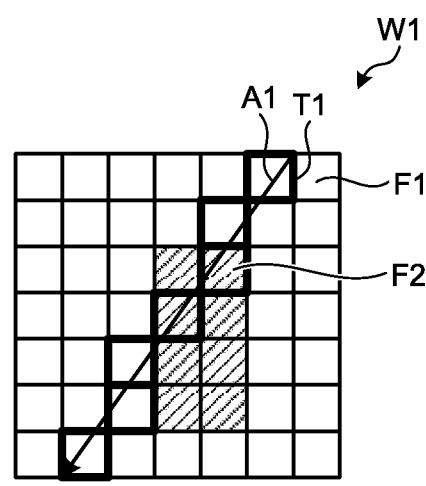
FIG. 8B is a diagram schematically illustrating an example of a direction in which the correlation value calculation unit according to the first embodiment of the present disclosure performs calculation for the image sensor.
Figure 8C:
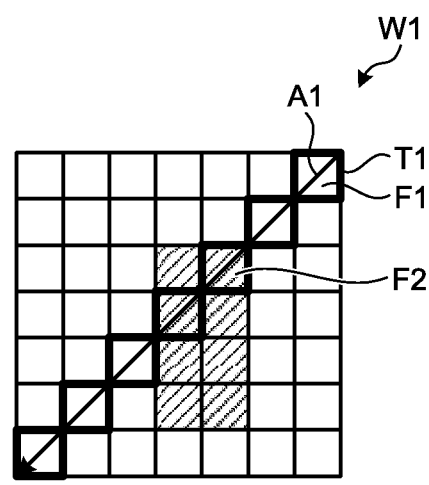
FIG. 8C is a diagram schematically illustrating an example of a direction in which the correlation value calculation unit according to the first embodiment of the present disclosure performs calculation for the image sensor.
Figure 8D:
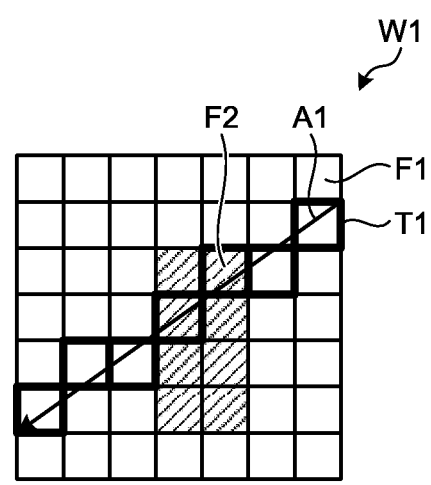
FIG. 8D is a diagram schematically illustrating an example of a direction in which the correlation value calculation unit according to the first embodiment of the present disclosure performs calculation for the image sensor.
Figure 8E:
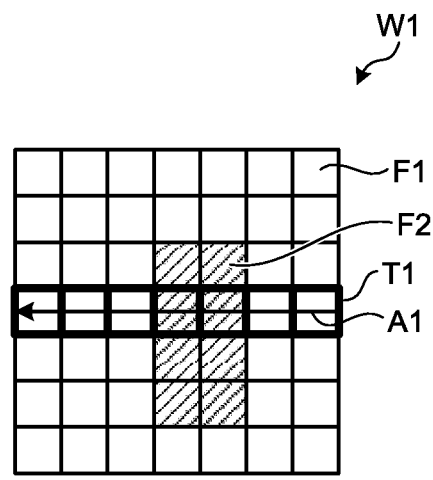
FIG. 8E is a diagram schematically illustrating an example of a direction in which the correlation value calculation unit according to the first embodiment of the present disclosure performs calculation for the image sensor.
Figure 8F:
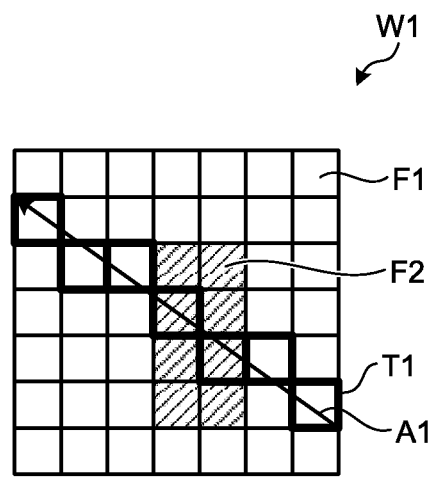
FIG. 8F is a diagram schematically illustrating an example of a direction in which the correlation value calculation unit according to the first embodiment of the present disclosure performs calculation for the image sensor.
Figure 8G:
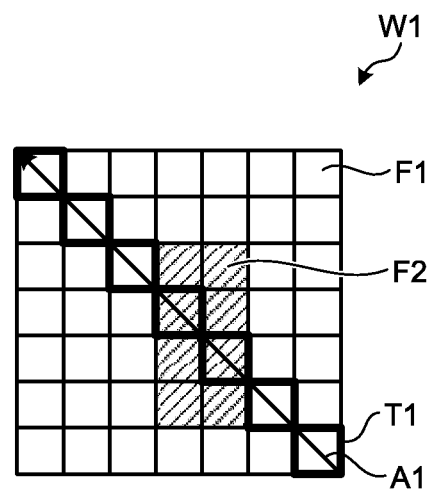
FIG. 8G is a diagram schematically illustrating an example of a direction in which the correlation value calculation unit according to the first embodiment of the present disclosure performs calculation for the image sensor.
Figure 8H:
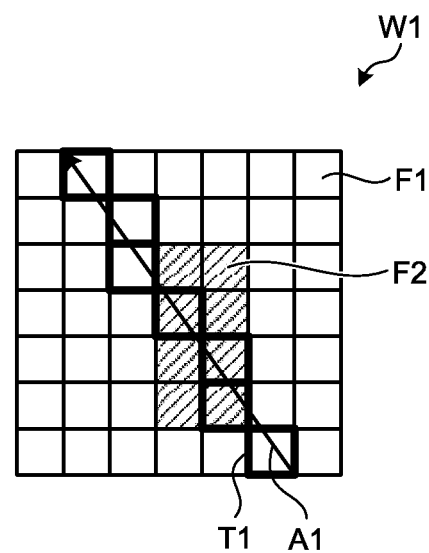
FIG. 8H is a diagram schematically illustrating an example of a direction in which the correlation value calculation unit according to the first embodiment of the present disclosure performs calculation for the image sensor.

In step S106, based on the RTS noise information acquired from the RTS noise information recording unit 112b, and the RAW image acquired from the volatile memory 111, via the second external I/F unit 21, the first external I/F unit 115, and the bus 113, the correlation value calculation unit 221 sequentially acquires the (i−1)th (the first, the second, and so on, and the seventh from an arrow departure point of the arrow A1 illustrated in FIGS. 8A to 8H) pixel values in the dir direction. More specifically, as illustrated in FIG. 8A, the correlation value calculation unit 221 acquires, from the RAW image W1, respective pixel values of a pixel N1 at the departure point of the arrow A1 to a pixel N7. In addition, the correlation value calculation unit 221 sequentially stores, into the buffer 242, the (i−1)th pixel value acquired for each of the (i−1)th pixels, by copying all the values in Prev1, Prev2, and Prev3 variables.

Subsequently, based on the RTS noise information acquired from the RTS noise information recording unit 112b via the second external I/F unit 21, the first external I/F unit 115, and the bus 113, the correlation value calculation unit 221 determines whether there is a possibility that RTS noise occurs in the (i−1)th pixel in the dir direction (step S107). When the correlation value calculation unit 221 determines that there is a possibility that RTS noise occurs in the (i−1)th pixel in the dir direction (step S107: Yes), the direction determination unit 22 advances processing to step S108 to be described later. In contrast to this, when the correlation value calculation unit 221 determines that there is no possibility that RTS noise occurs in the (i−1)th pixel in the dir direction (step S107: No), the direction determination unit 22 advances the processing to step S109 to be described later.

In step S108, based on the RTS noise information acquired from the RTS noise information recording unit 112b via the second external I/F unit 21, the first external I/F unit 115, and the bus 113, the correlation value calculation unit 221 corrects a pixel value of the (i−1)th pixel in the dir direction. More specifically, the correlation value calculation unit 221 corrects the pixel value of the (i−1)th pixel in the dir direction by subtracting, from Prev1 stored in the buffer 242, RTS_Value included in RTS noise information corresponding to the (i−1)th pixel (Prev1=Prev1−RTS_Value), and adding RTS_Value to Prev2 (Prev2=Prev2+RTS_Value). A pixel value in which no RTS noise is assumed to exist is thereby stored in any of Prev1, Prev2, and Prev3 in the buffer 242. After step S108, the direction determination unit 22 advances the processing to step S109.

Subsequently, the correlation value calculation unit 221 acquires the ith pixel value in the dir direction in the RAW image acquired from the volatile memory 111 via the second external I/F unit 21, the first external I/F unit 115, and the bus 113 (step S109). In addition, the correlation value calculation unit 221 stores acquired pixel values into the buffer 242 by copying all the values in Curr1, Curr2, and Curr3 variables.

After that, based on the RTS noise information acquired from the RTS noise information recording unit 112b via the second external I/F unit 21, the first external I/F unit 115, and the bus 113, the correlation value calculation unit 221 determines whether there is a possibility that RTS noise occurs in the ith pixel in the dir direction (step S110). When the correlation value calculation unit 221 determines that there is a possibility that RTS noise occurs in the ith pixel in the dir direction (step S110: Yes), the direction determination unit 22 advances the processing to step S111 to be described later. In contrast to this, when the correlation value calculation unit 221 determines that there is no possibility that RTS noise occurs in the ith pixel in the dir direction (step S110: No), the direction determination unit 22 advances the processing to step S112 to be described later.

In step S111, based on the RTS noise information acquired from the RTS noise information recording unit 112b via the second external I/F unit 21, the first external I/F unit 115, and the bus 113, the correlation value calculation unit 221 corrects a pixel value of the ith pixel in the dir direction. More specifically, the correlation value calculation unit 221 corrects the pixel value of the ith pixel in the dir direction by subtracting, from Curr1, RTS_Value included in RTS noise information corresponding to the ith pixel (Curr1=Curr1−RTS_Value), and adding RTS_Value to Curr2 (Curr2=Curr2+RTS_Value). A pixel value in which no RTS noise is assumed to exist is thereby stored in any of Curr1, Curr2, and Curr3 in the buffer 242. After step S111, the direction determination unit 22 advances the processing to step S112.

Subsequently, the correlation value calculation unit 221 calculates an absolute value of the minimum difference between the (i−1)th pixel value and the ith pixel value (step S112). More specifically, the correlation value calculation unit 221 calculates an absolute value obtained when a difference becomes the minimum, for all the combinations of Prev and Curr, such as Prev1 and Curr1, Prev1 and Curr2, Prev1 and Curr3, Prev2 and Curr1, and so on, and Prev3 and Curr3.

After that, the correlation value calculation unit 221 adds, to Δdir, an absolute value of the minimum difference calculated in step S112 (Δdir=Δdir+absolute value of minimum difference) (step S113).

Subsequently, the correlation value calculation unit 221 increments the number added to Δdir (Num=Num+1) (step S114), and increments the counter i indicating a position at which a correlation degree is to be obtained (i=i+1) (step S115).

After that, the correlation value calculation unit 221 determines whether the counter i indicating a position at which a correlation degree is to be obtained represents 7 or less (i≤7) (step S116). When the correlation value calculation unit 221 determines that the counter i indicating a position at which a correlation degree is to be obtained represents 7 or less (step S116: Yes), the direction determination unit 22 returns the processing to step S105. In contrast to this, when the correlation value calculation unit 221 determines that the counter i indicating a position at which a correlation degree is to be obtained does not represent 7 or less (step S116: No), the direction determination unit 22 advances the processing to step S117.

In step S117, the correlation value calculation unit 221 calculates an average of absolute values of differences between the (i−1)th pixel value and the ith pixel value (Δdir=Δdir÷Num). In this case, the correlation value calculation unit 221 calculates the maximum value of values that Δdir may take, when Num is 0 (i.e., when all pixels in the dir direction are isolated points), as an average of absolute values of differences between the (i−1)th pixel value and the ith pixel value.

Subsequently, the correlation value calculation unit. 221 increments the variable dir indicating a direction in which a correlation degree is to be calculated (dri=dri+1) (step S118).

After that, the correlation value calculation unit 221 determines whether the variable dir indicating a direction in which a correlation value degree is to be calculated is 8 or less (dir≤8) (step S119). When the correlation value calculation unit 221 determines that the variable dir indicating a direction in which a correlation value degree is to be calculated is 8 or less (step S119: Yes), the direction determination unit 22 returns the processing to step S102. In contrast to this, when the correlation value calculation unit 221 determines that the variable dir indicating a direction in which a correlation value degree is to be calculated is not 8 or less (step S119: No), the direction determination unit 22 advances the processing to step S120.

In step S120, the direction decision unit 222 searches Δ1 to Δ8 for the minimum Δdir, and decides a corresponding dir as a direction in which pixel values having the highest correlation with the pixel value of the pixel of interest are consecutively arrayed, and sets the decided direction as a direction determination result. After step S120, the direction determination unit 22 ends this processing.

According to the above-described first embodiment of the present disclosure, because the correlation value calculation unit 221 calculates a value obtained by adding RTS_Value to or subtracting RTS_Value from a pixel value of a pixel in which RTS noise occurs, and a direction in which pixel values having the highest correlation with the pixel value of the pixel of interest are consecutively arrayed is determined using the calculated calculation result, direction determination may be accurately performed on image data in which RTS noise occurs.

In addition, in the first embodiment of the present disclosure, the correlation value calculation unit 221 calculates a value obtained by adding RTS_Value to or subtracting RTS_Value from a pixel value of a pixel in which there is a possibility that RTS noise occurs. Alternatively, a value obtained by multiplying RTS_Value by a predetermined coefficient equal to or larger than 0 and smaller than 1 may be added or subtracted considering the distribution of RTS noise such as a noise.

First Modified Example of First Embodiment

Next, a first modified example of the first embodiment of the present disclosure will be described. The first modified example of the first embodiment of the present disclosure differs from the aforementioned first embodiment in the configuration of the image sensor 105 of the imaging system 1. More specifically, while no color filter is provided on a light receiving surface of the image sensor 105 in the aforementioned first embodiment, a color filter having the Bayer array is provided on the light receiving surface of the image sensor 105 in the first modified example of this first embodiment. Thus, a configuration of an image sensor according to the first modified example of this first embodiment will be described below. In addition, the same configurations as those in the imaging system 1 according to the aforementioned first embodiment are assigned the same sings, and the description thereof will be omitted.

Figure 9:
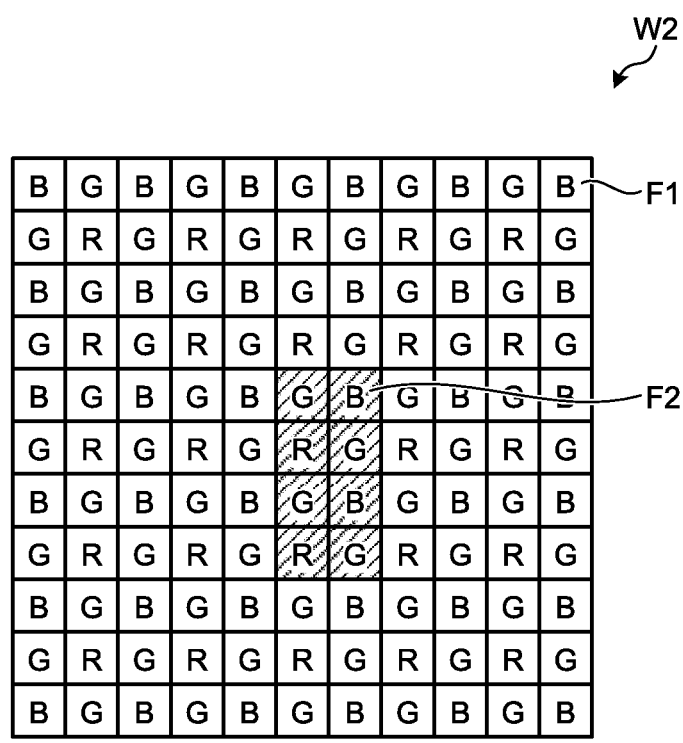
FIG. 9 is a diagram schematically illustrating a pixel array of an image sensor according to a first modified example of the first embodiment of the present disclosure.

FIG. 9 is a diagram schematically illustrating a pixel array of the image sensor according to the first modified example of the first embodiment of the present disclosure. In an image sensor 105*i* illustrated in FIG. 9, R filters, G filters and B filters that transmit wavelength regions different from each other are provided on the light receiving surface of the image sensor 105*i* in the Bayer array.

FIGS. 10A to 10D are diagrams each schematically illustrating an example of a direction in which the correlation value calculation unit 221 performs calculation on the image sensor 105*i*. In FIGS. 9 and 10A to 10D, a pixel F1 indicates a normal pixel (not hatched), and a pixel F2 indicates a pixel (hatched) in which there is a possibility that RTS noise occurs, a thick frame T1 indicates pixels used for direction determination, and an arrow A1 indicates a direction. In the first modified example of this first embodiment, numbers indicated by dir are assumed to be directions 1 to 4 in FIGS. 10A to 10D. In other words, by executing the aforementioned direction determination processing with the maximum value of dir in FIG. 6 being set to 4, and the maximum value of i being set to 5, the direction determination unit 22 obtains a value by adding RTS_Value to or subtracting RTS_Value from a pixel in which there is a possibility that RTS noise occurs, and performs direction determination while selecting a value having the highest correlation. The direction determination unit 22 thereby determines a direction in which pixel values having the highest correlation with the pixel value of the pixel of interest are consecutively arrayed.

According to the above-described first modified example of the first embodiment of the present disclosure, direction determination may be accurately performed on image data in which RTS noise occurs.

In addition, in the first modified example of the first embodiment of the present disclosure, in G pixels in which the G filters are provided on the light receiving surface, the direction determination unit 22 may be configured not to distinguish a column in which B pixels provided with B filters are arranged, and a column in which R pixels in which R filters are provided on the light receiving surface are arranged.

In addition, in the first modified example of the first embodiment of the present disclosure, the correlation value calculation unit 221 calculates a value obtained by adding RTS_Value to or subtracting RTS_Value from a pixel value of a pixel in which there is a possibility that RTS noise occurs. Alternatively, a value obtained by multiplying RTS_Value by a predetermined coefficient equal to or larger than 0 and smaller than 1 may be added or subtracted considering the distribution of RTS noise such as αnoise.

Second Modified Example of First Embodiment

Next, a second modified example of the first embodiment of the present disclosure will be described. The second modified example of the first embodiment of the present disclosure has the same configuration as the imaging system 1 according to the aforementioned first embodiment, and differs only in processing executed by the direction determination unit 22. More specifically, a direction determination unit according to the second modified example of this first embodiment pre-calculates a standard value in each direction in which a correlation degree is to be calculated in a RAW image, and as for a pixel in which there is a possibility that RTS noise occurs, decides a value closest to the standard value by adding RTS_Value to or subtracting RTS_Value from the pixel value, and determines a direction using the decided value. Thus, processing executed by the direction determination unit according to the second modified example of this first embodiment will be described below. In addition, the same configurations as those in the imaging system 1 according to the aforementioned first embodiment are assigned the same sings, and the description thereof will be omitted.

Processing of Direction Determination Unit

Figure 11:
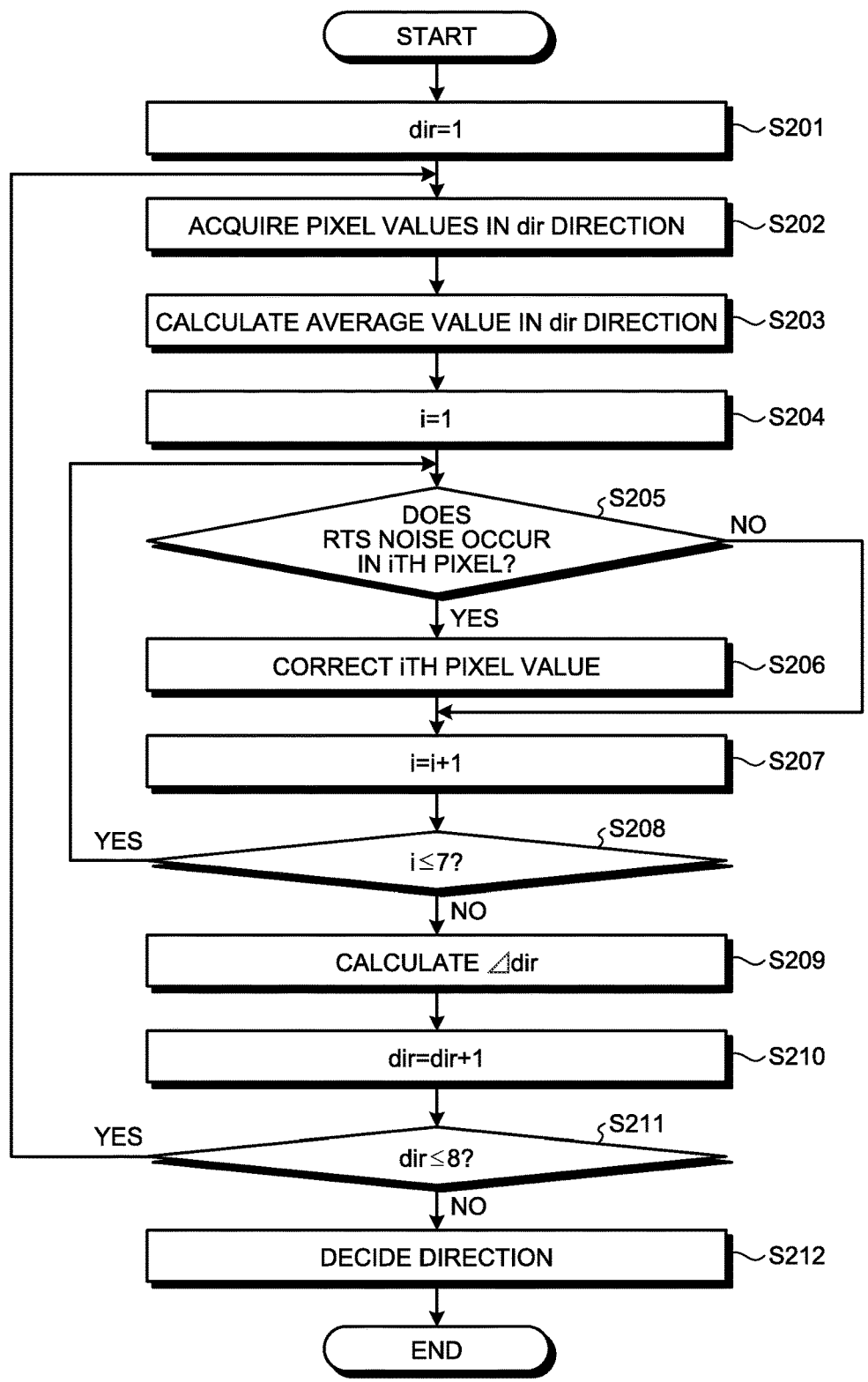
FIG. 11 is a flowchart illustrating overview of processing executed by a direction determination unit according to a second modified example of the first embodiment of the present disclosure.

FIG. 11 is a flowchart illustrating overview of processing executed by the direction determination unit 22 according to the second modified example of the first embodiment of the present disclosure, and is a flowchart illustrating overview of direction determination processing.

As illustrated in FIG. 11, the correlation value calculation unit 221 first initializes a variable dir indicating a direction in which a correlation degree is to be calculated (dir=1) (step S201).

Subsequently, the correlation value calculation unit 221 acquires all the respective pixel values of all pixels in the dir direction from the RAW image acquired from the volatile memory 111 via the second external I/F unit 21, the first external I/F unit 115, and the bus 113 (step S202). In addition, the correlation value calculation unit 221 stores all the acquired pixel values into the buffer 242 by copying the values in variables P1 to P7 in the order indicated by the arrow A1.

After that, the correlation value calculation unit 221 calculates an average value in the dir direction (step S203). More specifically, the correlation value calculation unit 221 calculates an average value of respective pixels in the variables P1 to P7 that have been acquired in step S202. In addition, in step S203, the correlation value calculation unit 221 may exclude a variable corresponding to an isolated point pixel, from the variables P1 to P7, and obtain an average value.

Subsequently, the correlation value calculation unit 221 initializes the counter i indicating a position at which a correlation degree is to be obtained (i=1) (step S204).

After that, based on the RTS noise information acquired from the RTS noise information recording unit 112*b* via the second external I/F unit 21, the first external I/F unit 115, and the bus 113, the correlation value calculation unit 221 determines whether there is a possibility that RTS noise occurs in the ith pixel in the dir direction (step S205). When the correlation value calculation unit 221 determines that there is a possibility that RTS noise occurs in the ith pixel in the dir direction (step S205: Yes), the direction determination unit 22 advances the processing to step S206 to be described later. In contrast to this, when the correlation value calculation unit 221 determines that there is no possibility that RTS noise occurs in the ith pixel in the dir direction (step S205: No), the direction determination unit 22 advances the processing to step S207 to be described later.

In step S206, based on the RTS noise information acquired from the RTS noise information recording unit 112b via the second external I/F unit 21, the first external I/F unit 115, and the bus 113, the correlation value calculation unit 221 corrects a pixel value of the ith pixel in the dir direction. More specifically, the correlation value calculation unit 221 corrects the pixel value by selecting, from Pi+RTS_Value, Pi, and Pi−RTS_Value, a value closest to the average value calculated in the aforementioned step S203, and replacing the value of Pi with the selected value. RTS noise may be thereby corrected easily. In addition, when there are a plurality of values closest to the average value calculated in the aforementioned step S203, the correlation value calculation unit 221 directly selects the value of Pi (does not replace Pi considering excess correction).

Steps S207 and S208 respectively correspond to the aforementioned steps S115 and S116 in FIG. 6.

Subsequently, the correlation value calculation unit 221 calculates an evaluation value Δdir leading to a correlation degree, using the variables P1 to P7 (step S209). More specifically, the correlation value calculation unit 221 calculates, as the evaluation value Δdir, any one of an absolute value of a difference between the minimum value and the maximum value in the respective pixel values of the variables P1 to P7, respective standard deviations and dispersions of the variables P1 to P7, and an average value of absolute values of differences between the pixels (e.g., average value of absolute values of differences between pixels neighboring in the arrow A1 direction). In addition, in step S209, the correlation value calculation unit 221 may exclude a variable corresponding to an isolated point pixel, from the variables P1 to P7, and obtain Δdir using the remaining variables. In this case, when all the pixels are isolated point pixels, by calculating, as Δdir, a value having the lowest correlation (e.g., the maximum value that may be taken as Δdir, in the case of standard deviation or dispersion), the dir direction may be prevented from being selected as a direction determination result.

Steps S210 to S212 respectively correspond to the aforementioned steps S118 to step S120 in FIG. 6.

According to the above-described second modified example of the first embodiment of the present disclosure, the correlation value calculation unit 221 pre-calculates, as a standard value, an average value in each dir direction, in each direction in which a correlation degree is to be calculated, and as for a pixel in which there is a possibility that RTS noise occurs, a value closest to the standard value is decided by adding RTS_Value to or subtracting RTS_Value from the pixel value, and a direction in which pixel values having the highest correlation with the pixel value of the pixel of interest are consecutively arrayed is decided using the decided value. As a result, direction determination may be accurately performed on image data in which RTS noise occurs.

In addition, in the second modified example of the first embodiment of the present disclosure, the correlation value calculation unit 221 adds RTS_Value to or subtracts RTS_Value from a pixel value. Alternatively, a value obtained by multiplying RTS_Value by a predetermined coefficient equal to or larger than 0 and smaller than 1 may be added or subtracted considering the distribution of RTS noise such as αnoise.

Third Modified Example of First Embodiment

Next, a third modified example of the first embodiment of the present disclosure will be described. The third modified example of the first embodiment of the present disclosure has the same configuration as the imaging system 1 according to the aforementioned first embodiment, and differs only in processing executed by the direction determination unit. More specifically, the direction determination unit according to the third modified example of this first embodiment decides a standard pixel, and performs direction determination while excluding the influence of RTS noise in the standard pixel, according to whether there is a possibility that RTS noise occurs in the pixel. Thus, processing executed by the direction determination unit according to the third modified example of this first embodiment will be described below. In addition, the same configurations as those in the imaging system 1 according to the aforementioned first embodiment are assigned the same sings, and the description thereof will be omitted.

Processing of Direction Determination Unit

Figure 12:
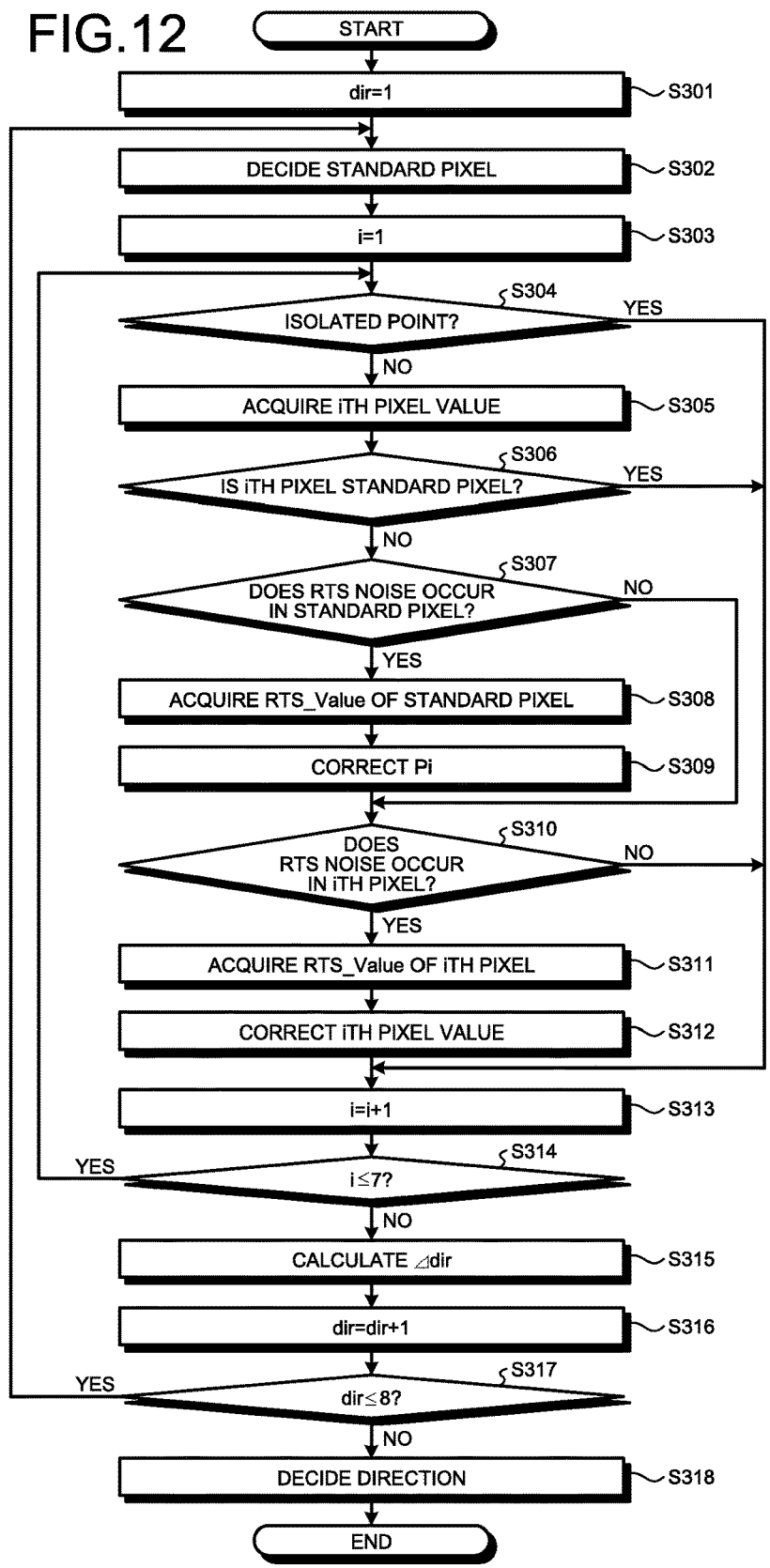
FIG. 12 is a flowchart illustrating overview of processing executed by a direction determination unit according to a third modified example of the first embodiment of the present disclosure.

FIG. 12 is a flowchart illustrating overview of processing executed by the direction determination unit 22 according to the third modified example of the first embodiment of the present disclosure, and is a flowchart illustrating overview of direction determination processing.

As illustrated in FIG. 12, the correlation value calculation unit 221 first initializes a variable dir indicating a direction in which a correlation degree is to be calculated (dir=1) (step S301).

Subsequently, the correlation value calculation unit 221 sets a pixel of interest as a standard pixel in the dir direction (step S302). In addition, when the pixel of interest is an isolated point pixel, the correlation value calculation unit 221 sets, as a standard pixel, a pixel being a pixel in the dir direction that is closest to the pixel of interest, and riot being an isolated point pixel. Nevertheless, when all the pixels in the dir direction are isolated point pixels, the pixel of interest is set as a standard pixel.

After that, the correlation value calculation unit 221 initializes the counter i indicating a position at which a correlation degree is to be obtained (i=1) (step S303).

Subsequently, based on the isolated point position information acquired from the isolated point position information recording unit 112d via the second external I/F unit 21, the first external I/F unit 115, and the bus 113, the correlation value calculation unit 221 determines whether the ith pixel is an isolated point pixel (step S304). When the correlation value calculation unit 221 determines that the ith pixel is an isolated point pixel (step S304: Yes), the direction determination unit 22 advances the processing to step S313 to be described later. In contrast to this, when the correlation value calculation unit 221 determines that the ith pixel is not an isolated point pixel (step S304: No), the direction determination unit 22 advances the processing to step S305 to be described later.

In step S305, the correlation value calculation unit 221 acquires the ith pixel value based on the RAW image obtained by acquiring the RAW image stored in the volatile memory 111, via the second external I/F unit. 21, the first external. I/F unit 115, and the bus 113 (step S305). In addition, the correlation value calculation unit 221 stores the acquired pixel value into the buffer 242 by copying the value as Pi.

After that, the correlation value calculation unit 221 determines whether the ith pixel is a standard pixel (step S306). When the ith pixel is determined as a standard pixel by the correlation value calculation unit 221 (step S306: Yes), the direction determination unit 22 advances the processing to step S313 to be described later. In contrast to this, when the ith pixel is determined as not standard pixel by the correlation value calculation unit 221 (step S306: No), the direction determination unit 22 advances the processing to step S307 to be described later.

In step S307, based on the RTS noise information acquired from the RTS noise information recording unit 112b via the second external I/F unit 21, the first external I/F unit 115, and the bus 113, the correlation value calculation unit 221 determines whether RTS noise occurs in the standard pixel. When the correlation value calculation unit 221 determines that there is a possibility that RTS noise occurs in the standard pixel (step S307: Yes), the direction determination unit 22 advances the processing to step S308 to be described later. In contrast to this, when the correlation value calculation unit 221 determines that there is no possibility that RTS noise occurs in the standard pixel (step S307: No), the direction determination unit 22 advances the processing to step S310 to be described later.

In step S308, the correlation value calculation unit 221 acquires RTS_Value of the standard pixel from the RTS noise information acquired from the RTS noise information recording unit 112b via the second external I/F unit 21, the first external I/F unit 115, and the bus 113.

Subsequently, the correlation value calculation unit 221 corrects Pi (step S309). More specifically, the correlation value calculation unit 221 corrects Pi by selecting, from Pi+RTS_Value, Pi, and Pi−RTS_Value, a value closest to the pixel value of the standard pixel decided in the aforementioned step S302, and replacing the value of Pi with the selected value. The influence to be exerted when RTS_Value occurs in the standard pixel may be thereby excluded.

After that, based on the RTS noise information acquired from the RTS noise information recording unit 112b via the second external I/F unit 21, the first external I/F unit 115, and the bus 113, the correlation value calculation unit 221 determines whether there is a possibility that RTS noise occurs in the ith pixel in the dir direction (step S310). When the correlation value calculation unit 221 determines that there is a possibility that RTS noise occurs in the ith pixel in the dir direction (step S310: Yes), the direction determination unit 22 advances the processing to step S311 to be described later. In contrast to this, when the correlation value calculation unit 221 determines that there is no possibility that RTS noise occurs in the ith pixel in the dir direction (step S310: No), the direction determination unit 22 advances the processing to step S313 to be described later.

In step S311, the correlation value calculation unit 221 acquires RTS_Value of the ith pixel from the RTS noise information acquired from the RTS noise information recording unit 112b via the second external I/F unit 21, the first external I/F unit 115, and the bus 113.

Subsequently, the correlation value calculation unit 221 corrects the ith pixel value by selecting, from among Pi+RTS_Value, Pi, and Pi−RTS_Value that have been corrected in step S309, a value closest to the pixel value of the standard pixel, and substituting the selected value into Pi (step S312). The influence to be exerted when RTS noise occurs in the ith pixel may be thereby excluded.

Steps S313 to S318 respectively correspond to the aforementioned steps S115 to step S120 in FIG. 6.

According to the above-described third modified example of the first embodiment of the present disclosure, the direction determination unit 22 decides the pixel of interest as a standard pixel, and performs direction determination while excluding the influence of RTS noise in the standard pixel, according to whether there is a possibility that RTS noise occurs in the standard pixel. As a result, direction determination may be accurately performed on image data in which RTS noise occurs.

In addition, in the third modified example of the first embodiment of the present disclosure, the correlation value calculation unit 221 calculates a value obtained by adding RTS_Value to or subtracting RTS_Value from a pixel value. Alternatively, a value obtained by multiplying RTS_Value by a predetermined coefficient equal to or larger than 0 and smaller than 1 may be added or subtracted considering the distribution of RTS noise such as a noise.

Fourth Modified Example of First Embodiment

Next, a fourth modified example of the first embodiment of the present disclosure will be described. The fourth modified example of the first embodiment of the present disclosure has the same configuration as the imaging system 1 according to the aforementioned first embodiment, and differs only in processing executed by the direction determination unit. More specifically, the direction determination unit according to the fourth modified example of this first embodiment performs edge direction determination by excluding a pixel in which there is a possibility that RTS noise occurs, in each direction in which a correlation degree is to be calculated. Thus, processing executed by the direction determination unit according to the fourth modified example of this first embodiment will be described below. In addition, the same configurations as those in the imaging system 1 according to the aforementioned first embodiment are assigned the same sings, and the description thereof will be omitted.

Processing of Direction Determination Unit

Figure 13:
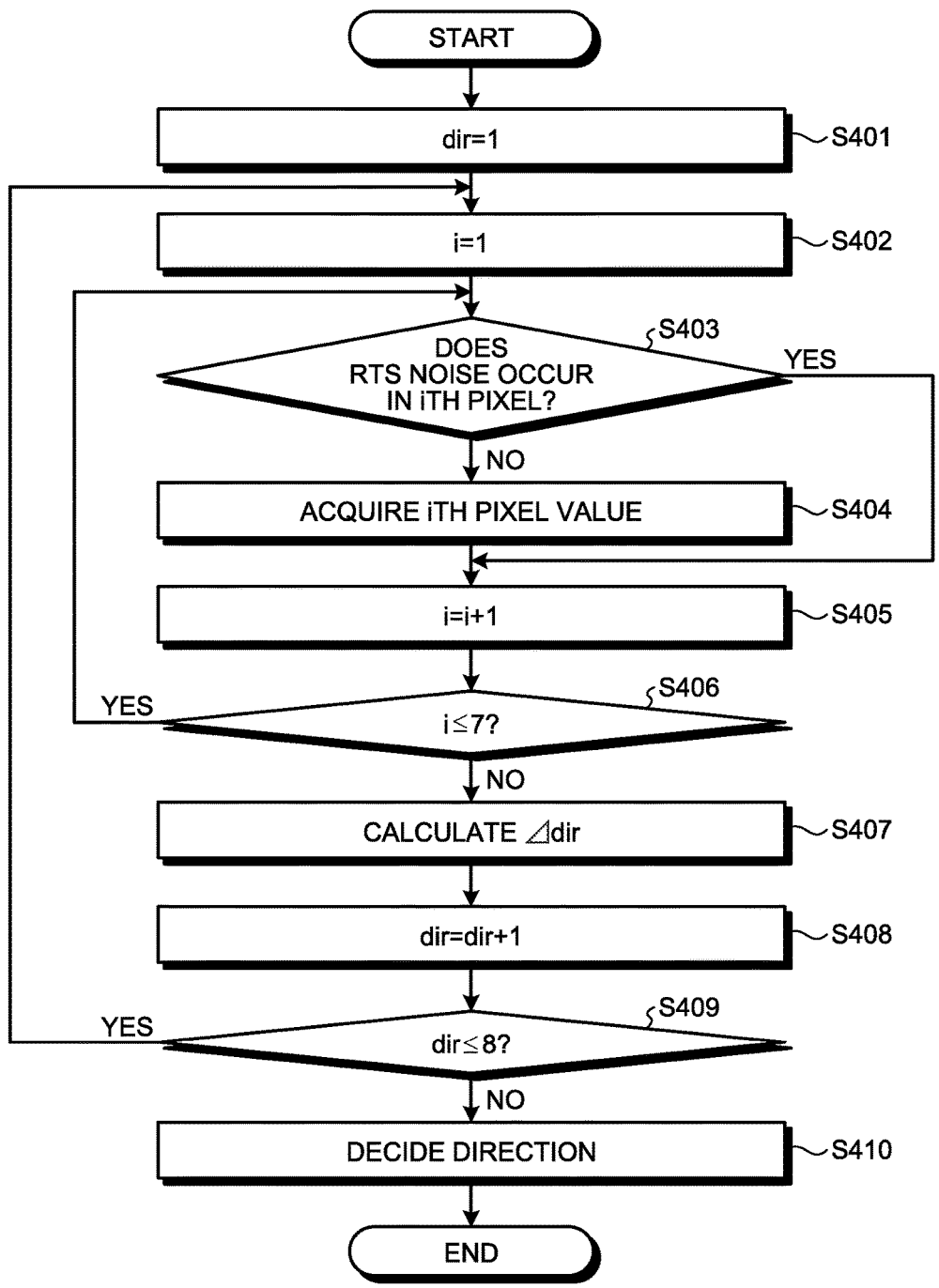
FIG. 13 a flowchart illustrating overview of processing executed by a direction determination unit according to a fourth modified example of the first embodiment of the present disclosure.

FIG. 13 is a flowchart illustrating overview of processing executed by the direction determination unit 22 according to the fourth modified example of the first embodiment of the present disclosure, and is a flowchart illustrating overview of direction determination processing.

As illustrated in FIG. 13, the correlation value calculation unit 221 first initializes a variable dir indicating a direction in which a correlation degree is to be calculated (dir=1) (step S401).

Subsequently, the correlation value calculation unit 221 initializes the counter i indicating a position at which a correlation degree is to be obtained (i=1) (step S402).

After that, based on the RTS noise information acquired from the RTS noise information recording unit 112b via the second external I/F unit 21, the first external I/F unit 115, and the bus 113, the correlation value calculation unit 221 determines whether there is a possibility that RTS noise occurs in the ith pixel (step S403). When the correlation value calculation unit 221 determines that there is a possibility that RTS noise occurs in the ith pixel (step S403: Yes), the direction determination unit 22 advances the processing to step S405 to be described later. In contrast to this, when the correlation value calculation unit 221 determines that there is no possibility that RTS noise occurs in the ith pixel the din direction (step S403: No), the direction determination unit 22 advances the processing to step S404 to be described later.

In step S404, the correlation value calculation unit 221 acquires the ith pixel value based on the RAW image acquired from the volatile memory 111 via the second external I/F unit 21, the first external I/F unit 115, and the bus 113. In addition, the correlation value calculation unit 221 stores the acquired pixel value into the buffer 242 by copying the value in the variables P1 to P7.

Steps S405 and S406 respectively correspond to the aforementioned steps S115 and S116 in FIG. 6.

In step S407, the correlation value calculation unit 221 calculates an evaluation value Δdir leading to a correlation degree, using only a pixel value of a pixel in which there is no possibility that RTS noise occurs that has been acquired in step S404. More specifically, the correlation value calculation unit 221 excludes, from the variables P1 to P7, a variable corresponding to a pixel in which there is a possibility that RTS noise occurs, and calculates, as the evaluation value Δdir, any one of an absolute value of a difference between the minimum value and the maximum value in the respective pixel values of the remaining variables, respective standard deviations and dispersions of the variables P1 to P7, and an average value of absolute values of differences between the pixels. In addition, in step S407, the correlation value calculation unit 221 may further exclude a variable corresponding to an isolated point pixel, and use the other variables for calculating Δdir. In addition, when all the variables P1 to P7 correspond to an isolated point pixel or a pixel in which there is a possibility that RTS noise occurs, the correlation value calculation unit 221 calculates, as Δdir, a value having the lowest correlation.

Steps S408 to S410 respectively correspond to the aforementioned steps S118 to step S120 in FIG. 6.

According to the above-described fourth modified example of the first embodiment of the present disclosure, the direction determination unit 22 performs direction determination by excluding a pixel in which there is a possibility that RTS noise occurs, in each direction in which a correlation degree is to be calculated in the RAW image. As a result, direction determination may be accurately performed on image data in which RTS noise occurs.

Fifth Modified Example of First Embodiment

Next, a fifth modified example of the first embodiment of the present disclosure will be described. The fifth modified example of the first embodiment of the present disclosure has the same configuration as the imaging system 1 according to the aforementioned first embodiment, and differs only in processing executed by the direction determination unit. More specifically, the direction determination unit according to the fifth modified example of this first embodiment performs edge direction determination by excluding a pixel in which there is a possibility that RTS noise occurs, when the pixel is distant from a standard by a predetermined value or more, in each direction in which a correlation degree is to be calculated. Thus, processing executed by the direction determination unit according to the fifth modified example of this first embodiment will be described below. In addition, the same configurations as those in the imaging system 1 according to the aforementioned first embodiment are assigned the same sings, and the description thereof will be omitted.

Processing of Direction Determination Unit

Figure 14:
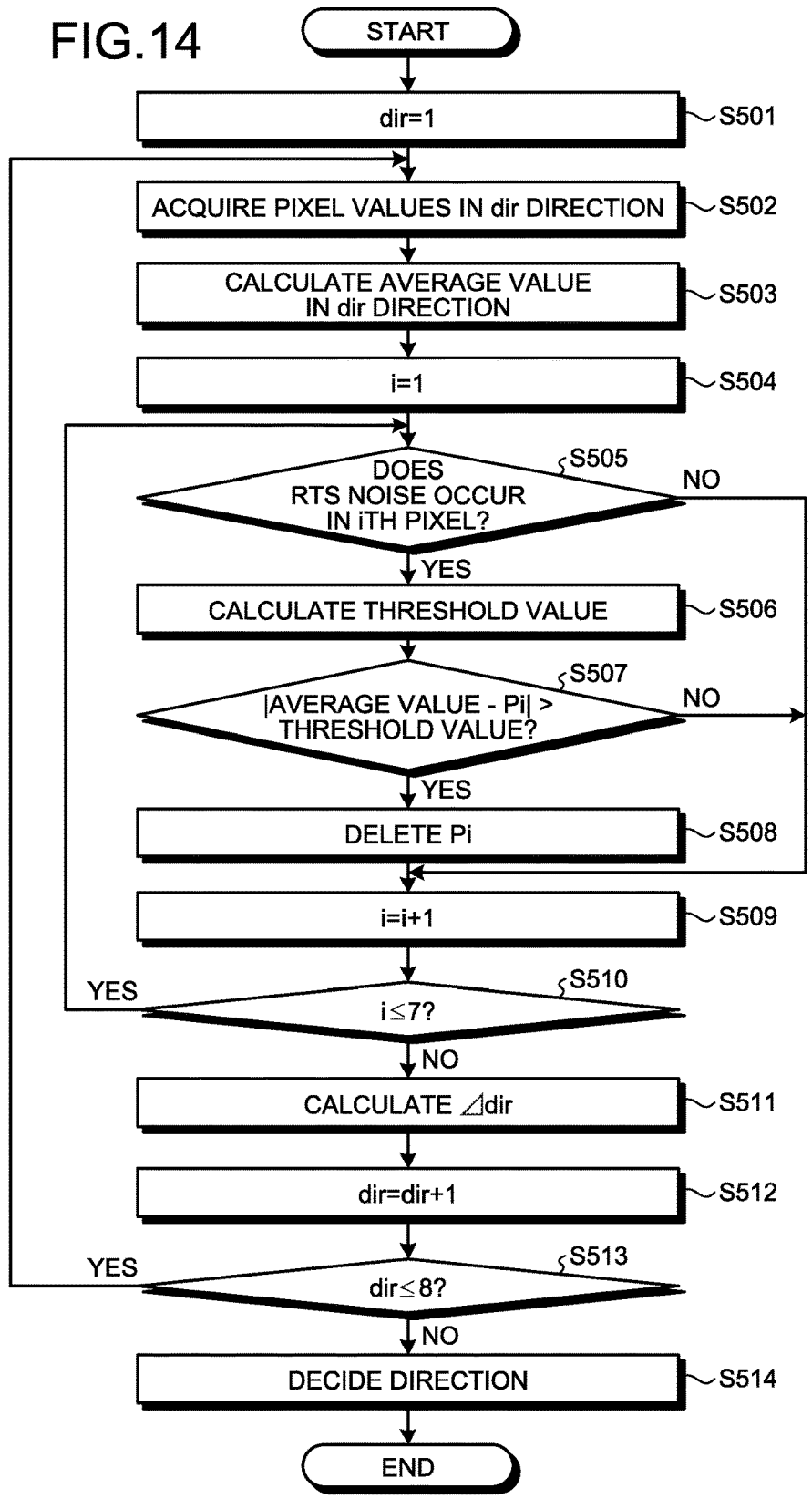
FIG. 14 is a flowchart illustrating overview of processing executed by a direction determination unit according to a fifth modified example of the first embodiment of the present disclosure.

FIG. 14 is a flowchart illustrating overview of processing executed by the direction determination unit 22 according to the fifth modified example of the first embodiment of the present disclosure, and is a flowchart illustrating overview of direction determination processing.

In FIG. 14, steps S501 to S505 respectively correspond to the aforementioned steps S201 to step S205 in FIG. 11.

In step S506, the correlation value calculation unit 221 acquires RTS_Value of the ith pixel in the dir direction from the RTS noise information recording unit 112b via the second external I/F unit 21, the first external I/F unit 115, and the bus 113, and calculates a value obtained by multiplying the acquired RTS_Value by a predetermined coefficient, as a threshold value. Here, the predetermined coefficient is preferably 1 or less, and is 0.5, for example.

The correlation value calculation unit 221 determines whether an absolute value of a difference between Pi acquired in the aforementioned step S502 and the average value calculated in step S503 is larger than the threshold value calculated in step S506 ([average value −Pi]>threshold value) (step S507). When the correlation value calculation unit 221 determines that an absolute value of a difference between Pi acquired in the aforementioned step S502 and the average value calculated in step S503 is larger than the threshold value calculated in step S506 (step S507: Yes), the direction determination unit 22 advances the processing to step S508 to be described later. In contrast to this, when the correlation value calculation unit 221 determines that an absolute value of a difference between Pi acquired in the aforementioned step S502 and the average value calculated in step S503 is not larger than the threshold value calculated in step S506 (step S507: No), the direction determination unit 22 advances the processing to step S509 to be described later.

In step S508, the correlation value calculation unit 221 deletes Pi stored in step S502.

Steps S509 and S510 respectively correspond to steps S115 and S116 in FIG. 6.

In step S511, the correlation value calculation unit 221 calculates, as an evaluation value Δdir, any one of an absolute value of a difference between the minimum value and the maximum value in the respective pixel values of the variables Pi to P7 that have remained after the processing in the aforementioned step S508, respective standard deviations and dispersions of the variables P1 to P7, and an average value of absolute values of differences between the pixels.

Steps S512 to S514 respectively correspond to the aforementioned steps S118 to step S120 in FIG. 6.

According to the above-described fifth modified example of the first embodiment of the present disclosure, when an absolute value of a difference between the variable Pi and the average value in the dir direction is larger than a threshold value obtained by multiplying RTS_Value of a pixel in which there is a possibility that RTS noise occurs, by the predetermined coefficient, in each direction in which a correlation degree is to be calculated, the direction determination unit 22 determines that RTS noise occurs in the pixel, and performs direction determination by excluding the pixel value. Thus, direction determination may be accurately performed on image data in which RTS noise occurs.

In addition, in the fifth modified example of the first embodiment of the present disclosure, direction determination may be performed by uniformly excluding a pixel in which there is a possibility that RTS noise occurs (pixel having position information recorded in the RTS noise information recording unit 112b as a pixel in which there is a possibility that RTS noise occurs). A calculation amount may be thereby reduced as compared with the fifth modified example of the aforementioned first embodiment of the present disclosure.

Second Embodiment

Next, a second embodiment of the present disclosure will be described. An imaging system according to this second embodiment differs from that according to the aforementioned first embodiment in the configuration of the imaging system 1. More specifically, the imaging system according to this second embodiment differs from that according to the aforementioned first embodiment in the configuration of an image processing apparatus. Thus, a configuration of an imaging system according to this second embodiment will be described below. In addition, the same configurations as those in the imaging system 1 according to the aforementioned first embodiment are assigned the same sings, and the description thereof will be omitted.

Configuration of Imaging System

Figure 15:
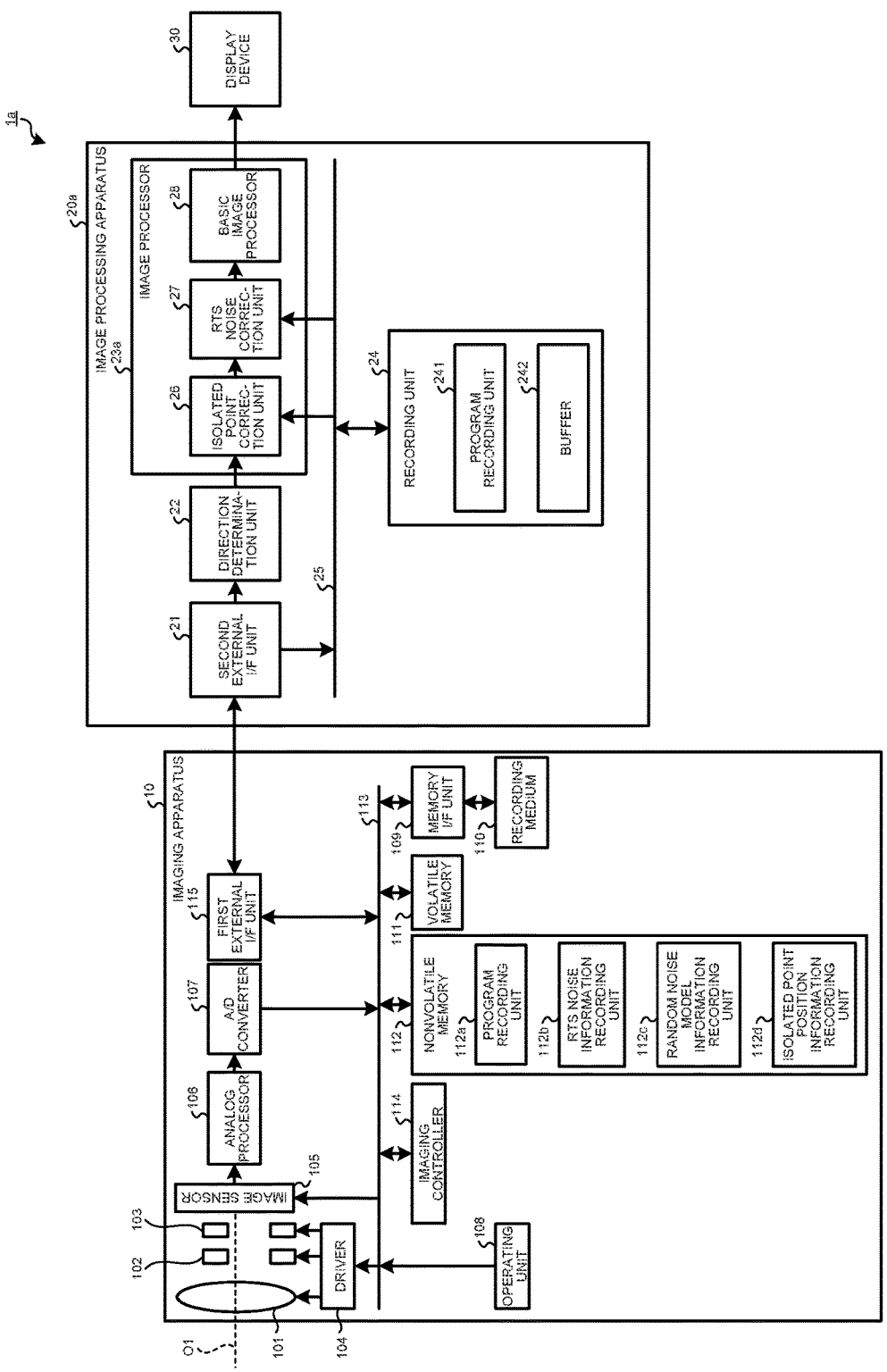
FIG. 15 is a block diagram schematically illustrating a configuration of an imaging system according to a second embodiment of the present disclosure.

FIG. 15 is a block diagram schematically illustrating a configuration of the imaging system according to the second embodiment of the present disclosure. An imaging system 1a illustrated in FIG. 15 includes an image processing apparatus 20a in place of the image processing apparatus 20 according to the aforementioned first embodiment.

Configuration of Image Processing Apparatus

A configuration of the image processing apparatus 20a will be described. The image processing apparatus 20a includes an image processor 23a in place of the image processor 23 according to the aforementioned first embodiment.

The image processor 23a includes an isolated point correction unit 26, an RTS noise correction unit 27, and a basic image processor 28.

Figure 16:
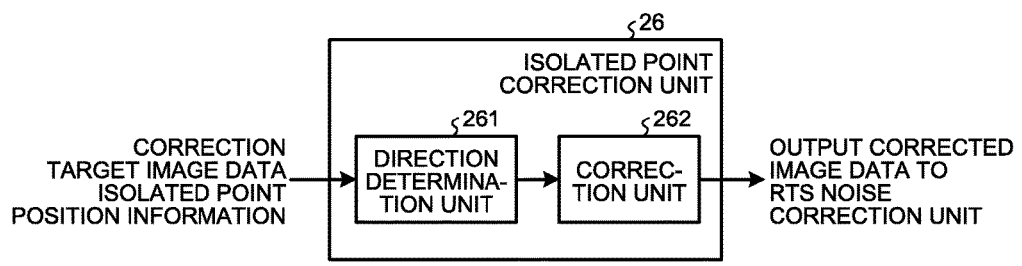
FIG. 16 is a block diagram illustrating a functional configuration of an isolated point correction unit according to the second embodiment of the present disclosure.

The isolated point correction unit 26 acquires isolated point position information from the isolated point position information recording unit 112d, and a RAW image from the volatile memory 111, via the second external I/F unit 21, the first external I/F unit 115, and the bus 113, and outputs image data in which an isolated point has been corrected, to the RTS noise correction unit 27, based on the acquired isolated point position information. Here, a detailed configuration of the isolated point correction unit 26 will be described. FIG. 16 is a block diagram illustrating a functional configuration of the isolated point correction unit 26. As illustrated in FIG. 16, the isolated point correction unit 26 includes a direction determination unit 261 and a correction unit 262.

The direction determination unit 261 has a function similar to that of the aforementioned the direction determination unit 22, and determines a direction in which correlation is the highest, in a pixel value of a pixel of interest in the RAW image and pixel values of neighboring pixels of the pixel of interest.

The correction unit 262 reduces noise by correcting noise in image data based on the determination result of the direction determination unit 261.

The RTS noise correction unit 27 corrects RTS noise in the image data that has been corrected by the isolated point correction unit 26, and outputs the RTS noise to the basic image processor 28.

Figure 17:
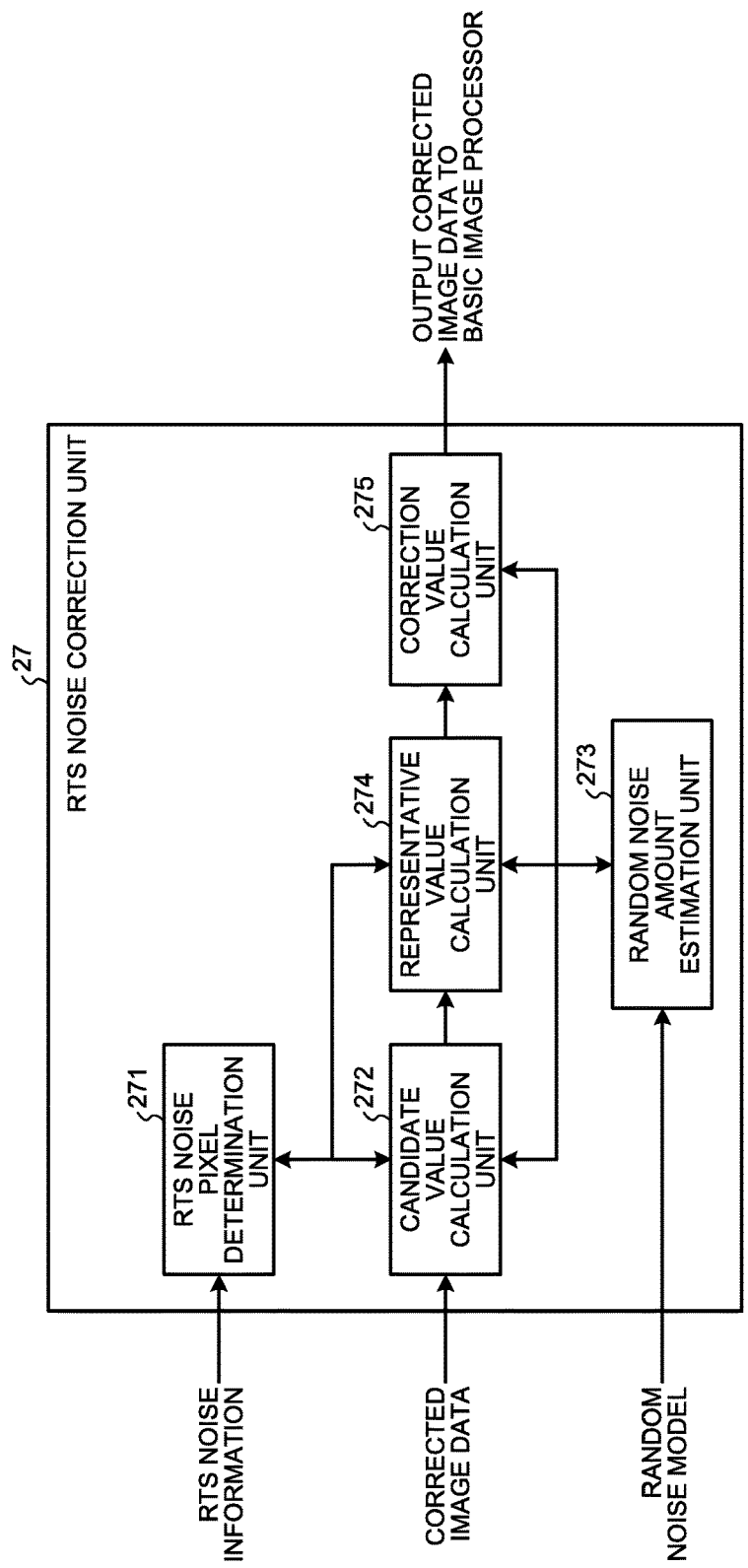
FIG. 17 is a block diagram illustrating a functional configuration of an RTS noise correction unit according to the second embodiment of the present disclosure.

Here, a detailed configuration of the RTS noise correction unit 27 will be described. FIG. 17 is a block diagram illustrating a functional configuration of the RTS noise correction unit 27. As illustrated in FIG. 17, the RTS noise correction unit 27 includes an RTS noise pixel determination unit 271, a candidate value calculation unit 272, a random noise amount estimation unit 273, a representative value calculation unit 274, and a correction value calculation unit 275.

The RTS noise pixel determination unit 271 acquires RTS noise information recorded in the RTS noise information recording unit 112b of the imaging apparatus 10, via the second external I/F unit 21, the first external I/F unit 115, and the bus 113, determines whether there is a possibility that RTS noise occurs in pixels on the acquired RAW image, and outputs the determination result to the candidate value calculation unit 272 and the representative value calculation unit 274. More specifically, when a position of a pixel is input to the RTS noise pixel determination unit 271, the RTS noise pixel determination unit 271 determines whether RTS noise information corresponding to the pixel is recorded in the RTS noise information recording unit 112b of the imaging apparatus 10, and outputs the RTS noise information information indicating that there is RTS noise) if the RTS noise information is recorded. On the other hand, if the RTS noise information is not recorded in the RTS noise information recording unit 112b of the imaging apparatus 10, the RTS noise pixel determination unit 271 regards the pixel as a pixel in which RTS noise does not occur, and does not output RTS noise information.

When it is determined by the RTS noise pixel determination unit 271 that there is a possibility that RTS noise occurs in a pixel of interest, the candidate value calculation unit 272 calculates a plurality of candidate values of a correction amount for the pixel value of the pixel of interest, based on the pixel value of the pixel of interest in the RAN image, and the determination result of the RTS noise pixel determination unit 271, and outputs the pixel value of the pixel of interest in the RAW image, and the plurality of calculated candidate values to the representative value calculation unit 274, the random noise amount estimation unit 273, and the correction value calculation unit 275.

The random noise amount estimation unit 273 acquires a random noise model recorded in the random noise model information recording unit 112c, via the second external I/F unit 21, the first external I/F unit 115, and the bus 113, and calculates a random noise amount according to the pixel value of the pixel of interest or a reference value in a RAW image in the vicinity of the pixel of interest, based on the acquired random noise model and the reference value calculated by the representative value calculation unit 274.

When it is determined by the RTS noise pixel determination unit 271 that there is a possibility that RTS noise occurs in the pixel of interest, based on a neighboring pixel of the pixel of interest that is determined at least by the RTS noise pixel determination unit 271 as a pixel in which RTS noise does not occur, a reference value of a random noise amount corresponding to the pixel of interest that has been calculated by the random noise amount estimation unit 273, RTS_Value, or the maximum value of the correction amount, the representative value calculation unit 274 calculates a representative value corresponding to a pixel value obtainable when RTS noise does not occur. The representative value calculation unit 274 outputs the pixel value of the pixel of interest in the RAW image, the plurality of candidate values, and the representative value calculated in the aforementioned processing, to the correction value calculation unit 275.

Figure 18:
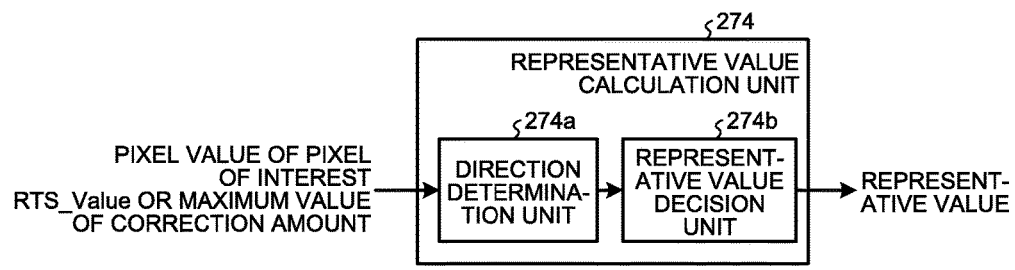
FIG. 18 is a block diagram illustrating a functional configuration of a representative value calculation unit according to the second embodiment of the present disclosure.

Here, a detailed configuration of the representative value calculation unit 274 will be described. FIG. 18 is a block diagram illustrating a functional configuration of the representative value calculation unit 274. As illustrated in FIG.

18, the representative value calculation unit 274 includes a direction determination unit 274a and a representative value decision unit 274b.

The direction determination unit 274a has a function similar to that of the aforementioned the direction determination unit 22, and determines a direction in which correlation is the highest, in a pixel value of a pixel of interest in the RAW image and pixel values of neighboring pixels of the pixel of interest.

Based on the determination result of the direction determination unit 274a, the representative value decision unit 274b decides a representative value corresponding to a pixel value obtainable when RTS noise does not occur.

When it is determined by the RTS noise pixel determination unit 271 that the pixel of interest is a pixel in which there is a possibility that RTS noise occurs, the correction value calculation unit 275 corrects the pixel value of the pixel of interest based on the plurality of candidate values calculated by the candidate value calculation unit 272. More specifically, based on the pixel value of the pixel of interest in the RAW image, the plurality of candidate values calculated by the candidate value calculation unit 272, and the representative value calculated by the representative value calculation unit 274, the correction value calculation unit 275 calculates a pixel value in which RTS noise has been corrected, and outputs the pixel value to the basic image processor 28. More specifically, the correction value calculation unit 275 corrects the pixel value of the pixel of interest based on a candidate value that generates a correction result closest to the representative value calculated by the representative value calculation unit 274, among the plurality of candidate values calculated by the candidate value calculation unit 272. In contrast to this, when it is determined by the RTS noise pixel determination unit 271 that the pixel of interest is not a pixel in which there is a possibility that RTS noise occurs, the correction value calculation unit 275 directly outputs the pixel value of the pixel of interest in the RAW image.

Referring back to FIG. 15, the description of the configuration of the image processing apparatus 20a will be continued.

Based on a determination result of the direction determination unit 22, the basic image processor 28 performs predetermined image processing on the corrected image data input from the RTS noise correction unit 27, and outputs the image data to the display device 30. Here, as the predetermined image processing, basic image processing is performed including at least optical black reduction processing and white balance adjustment processing, and including synchronization processing of image data, color matrix calculation processing, γ-correction processing, color reproduction processing, edge enhancement processing, noise reduction processing, and the like when the image sensor 105 has the Bayer array. In addition, the basic image processor 28 performs image processing for reproducing a natural image, based on preset parameters of each type of image processing. Here, the parameters of each type of image processing include values of contrast, sharpness, saturation, white balance, and gradation.

Processing of Isolated Point Correction Unit

Figure 19:
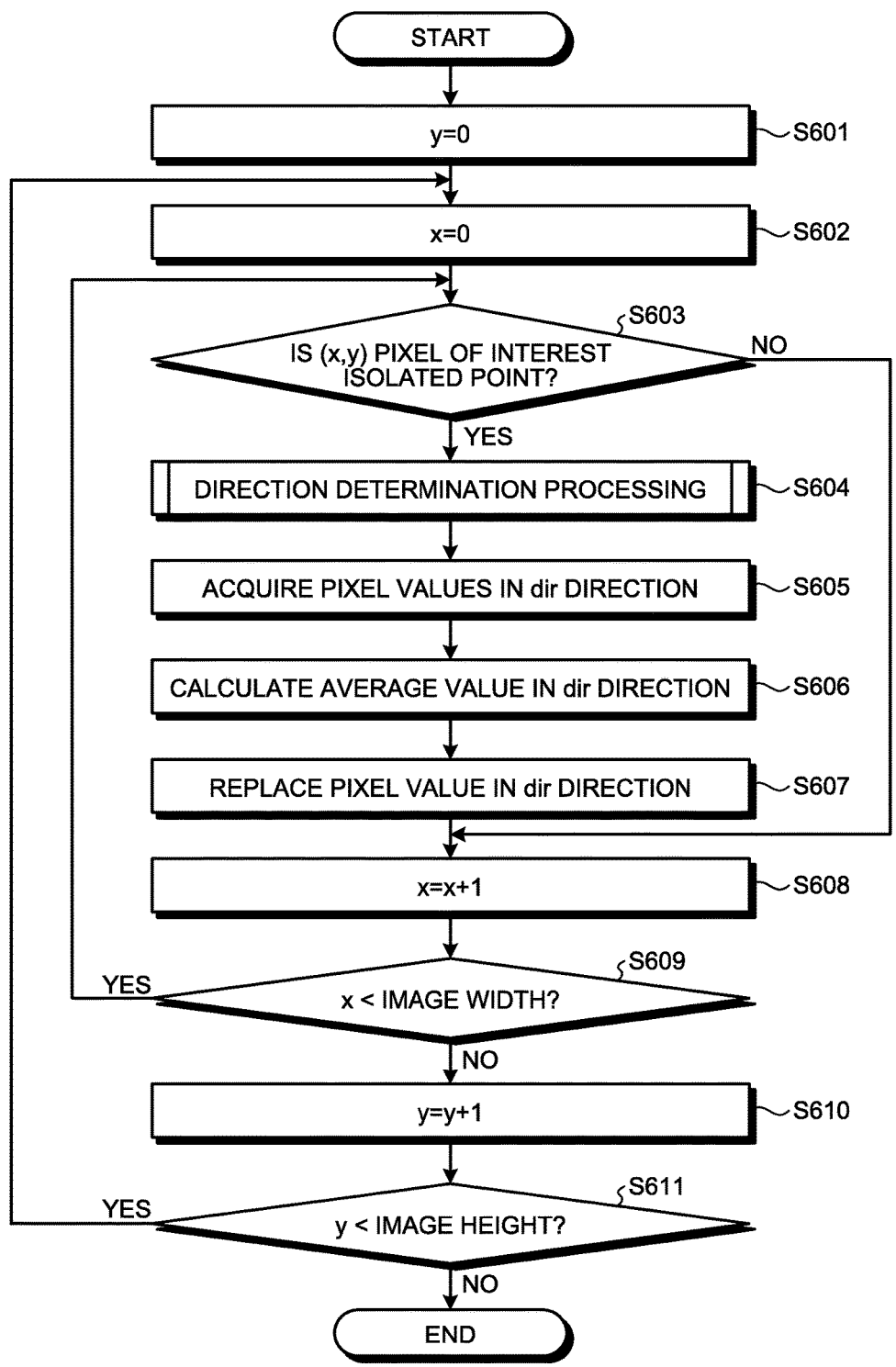
FIG. 19 is a flowchart illustrating overview of processing executed by the isolated point correction unit according to the second embodiment of the present disclosure.

Next, processing executed by the isolated point correction unit 26 will be described. FIG. 19 is a flowchart illustrating overview of processing executed by the isolated point correction unit 26, is a flowchart illustrating overview of isolated point correction processing.

As illustrated in FIG. 19, the isolated point correction unit 26 first initializes a counter y indicating a position of a pixel in a height direction (longitudinal direction) of an image corresponding to image data stored in the buffer 242 of the recording unit 24 (y=0) (step S601), and initializes a counter x indicating a position of a pixel in a width direction (traverse direction) of an image corresponding to image data (x=0) (step S602).

Subsequently, based on the isolated point position information acquired from the isolated point position information recording unit 112d via the second external I/F unit 21, the first external I/F unit 115, and the bus 113, the isolated point correction unit 26 determines whether a pixel of interest in a coordinate (x, y) is an isolated point (step S603). When the pixel of interest in the coordinate (x, y) is an isolated point (step S603: Yes), the isolated point correction unit 26 advances the processing to step S604 to be described later. In contrast to this, when the pixel of interest in the coordinate (x, y) is not an isolated point (step S603: No), the isolated point correction unit 26 advances the processing to step S608 to be described later.

In step S604, the direction determination unit 261 executes the direction determination processing of any of the aforementioned first embodiment and the second to fifth modified examples of the aforementioned first embodiment. Thus, in this second embodiment, the description of the direction determination processing will be omitted. In addition, in step S203 in the second modified example of the aforementioned first embodiment, the direction determination unit 261 calculates an average value by excluding a pixel value of an isolated point pixel.

Subsequently, based on the determination result of the direction determination unit 261, the correction unit 262 acquires, from the buffer 242, all the pixel values in the dir direction determined by the direction determination unit 261 (step S605). In addition, the correction unit 262 stores the acquired pixel values into the buffer 242 by copying the values in the variables P1 to P7.

After that, based on isolated point position information acquired from the isolated point position information recording unit 112d via the first external I/F unit 115 and the bus 113, the correction unit 262 excludes an isolated point pixel from the variables P1 to P7, and calculates an average value in the dir direction using pixel values of the remaining pixels (step S606). In addition, in place of an average value, the correction unit 262 may calculate any of a weighted average, a mode value, and a median value of the variables P1 P7.

Subsequently, the correction unit 262 corrects the isolated point pixel by replacing a pixel value in the dir direction by placing the pixel value of the pixel of interest in the coordinate (x, y) stored in the buffer 242, with the average value calculated in step S606 (step S607).

After that, the correction unit 262 increments the counter x (x=x+1) (step S608).

Subsequently, when the counter x is smaller than a width of an image corresponding to image data (step S609: Yes), the isolated point correction unit 26 returns the processing to step S603. In contrast to this, when the counter x is not smaller than a width of an image corresponding to image data (step S609: No), the isolated point correction unit 26 advances the processing to step S610.

Subsequently, the isolated point correction unit 26 increments the counter y (y=y+1) (step S610).

After that, when the counter y is smaller than a height of an image corresponding to image data (step S611: Yes), the isolated point correction unit 26 returns the processing to step S602. In contrast to this, when the counter y is not smaller than a height of an image corresponding to image data (step S611: No), the isolated point correction unit 26 ends this processing.

In this manner, for increasing correlation in a direction in which correlation is the highest, based on the determination result of the direction determination unit 261, the isolated point correction unit 26 removes an isolated point, and generates image data in which an edge direction has been corrected, and outputs the image data to the RTS noise correction unit 27.

Processing of RTS Noise Correction Unit

Figure 20:
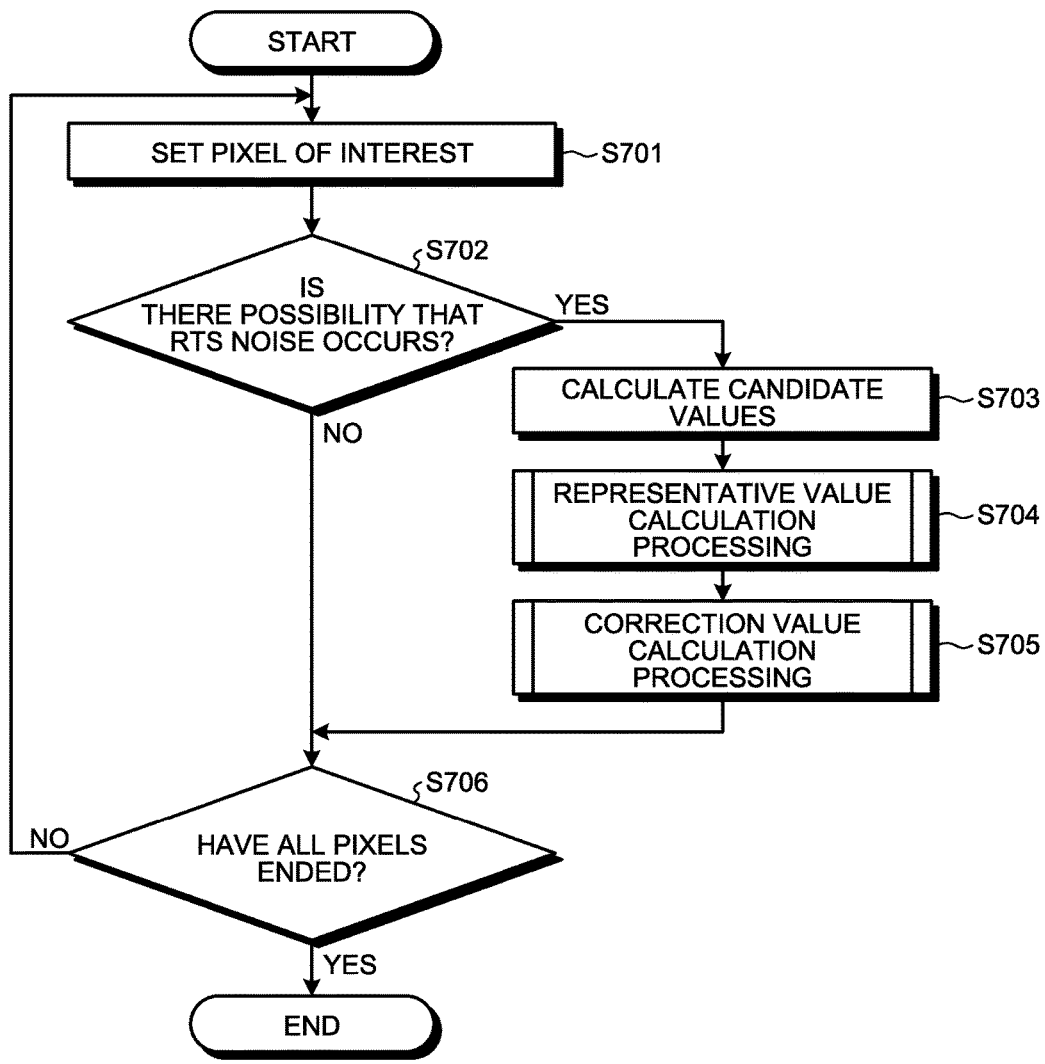
FIG. 20 is a flowchart illustrating overview of processing executed by the RTS noise correction unit according to the second embodiment of the present disclosure.

Next, processing executed by the RTS noise correction unit 27 will be described. FIG. 20 is a flowchart illustrating overview of processing executed by the RTS noise correction unit 27, and is a flowchart illustrating overview of RTS noise correction processing.

As illustrated in FIG. 20, the RTS noise correction unit 27 first sets a pixel of interest for sequentially performing processing in steps S702 to S705 to be described later (step S701). In addition, the RTS noise correction unit 27 sequentially allocates, as an index, an integer larger than 0 as 1, 2, 3, and so on, to each pixel in the RAW image, in a raster order starting from the upper left toward the lower right. Next, the RTS noise correction unit 27 increments a counter of the buffer 242 by 1, each time step S701 is executed (counter is reset to 0 at a time point when the processing in FIG. 20 is started). The RTS noise correction unit 27 sets, as a pixel of interest, a pixel to which an index indicated by the counter is allocated. In other words, when step S701 is initially executed by the RTS noise correction unit 27, the RTS noise correction unit 27 increments the counter reset to 0, by 1. Thus, the counter indicates 1, and an upper left pixel becomes a pixel of interest. When the RTS noise correction unit 27 executes the processing in step S701 twice (the second time), the counter indicates 2. Thus, a pixel on the right side of the upper left pixel becomes a pixel of interest.

Subsequently, the RTS noise pixel determination unit 271 acquires RTS noise information recorded in the RTS noise information recording unit 112b of the nonvolatile memory 112 of the imaging apparatus 10, via the second external I/F unit 21, the first external I/F unit 115, and the bus 113, and determines, based on the acquired RTS noise information, whether there is a possibility that RTS noise occurs in the pixel of interest (step S702). In other words, the RTS noise pixel determination unit 271 determines whether position information of a share pixel block including a pixel of interest is included in the RTS noise information. More specifically, the RTS noise pixel determination unit 271 determines whether position information of the share pixel block including the pixel of interest is included in the RTS noise information as a share pixel block in which there is a possibility that RTS noise occurs. When it is determined by the RTS noise pixel determination unit 271 that there is a possibility that RTS noise occurs in the pixel of interest (determined that position information of the share pixel block including the pixel of interest is included in the RTS noise information)(step S702: Yes), the RTS noise correction unit 27 advances the processing to step S703 to be described later. In contrast to this, when it is determined by the RTS noise pixel determination unit 271 that there is no possibility that RTS noise occurs in the pixel of interest (determined that position information of the share pixel block including the pixel of interest is not included in the RTS noise information) (step S702: No), the RTS noise correction unit 27 advances the processing to step S706 to be described later. In this case, when the RTS noise pixel determination unit 271 determines that there is no possibility that RTS noise occurs in the pixel of interest, the RTS noise pixel determination unit 271 directly outputs the pixel value of the pixel of interest in the RAW image to the representative value calculation unit 274 as a corrected pixel value.

In step S703, the candidate value calculation unit 272 calculates a plurality of candidate values of a correction amount for correcting RTS noise. More specifically, based on RTS_Value corresponding to the pixel of interest (included in RTS noise information included in RTS noise output from the RTS noise pixel determination unit 271), the candidate value calculation unit 272 sets, as candidate values, all values equal to or larger than 0 and equal to smaller than RTS_Value that may be taken as a pixel value (when only integers may be taken as a RAW image, all integers equal to or larger than 0 and equal to or smaller than RTS_Value). In addition, when an amplifier gain value set by the imaging controller 114 to a column amplifier or the like of the image sensor 105 at the time of RTS noise detection (defined as amplifier gain value=G0), and an amplifier gain value set at the time of RTS noise correction (defined as amplifier gain value=G1) are different, the candidate value calculation unit 272 may replace RTS_Value with a value obtained by multiplying a ratio between the amplifier gain value set at the time of RTS noise correction and the amplifier gain value set at the time of RTS noise detection (G=G1/G0) by RTS_Value. In addition, the candidate value calculation unit 272 may cause RTS noise information to have RTS_Value s of respective amplifier gain values that may be preset, and use RTS_Value according to the set amplifier gain values. In addition, the candidate value calculation unit 272 may select a predetermined number of values from among the values equal to or larger than 0 and equal to or smaller than RTS_Value that may be taken as a pixel value, and sets the selected values as candidate values.

Subsequently, based on a pixel value in the RAW image surrounding the pixel of interest, the representative value calculation unit 274 executes representative value calculation processing of calculating a representative value (pixel value in the RAW image that is predicted when RTS noise does not occur in the pixel of interest) (step S704). In addition, a representative value calculation unit 274 may include a pixel in which there is a possibility that RTS noise occurs.

Figure 21:
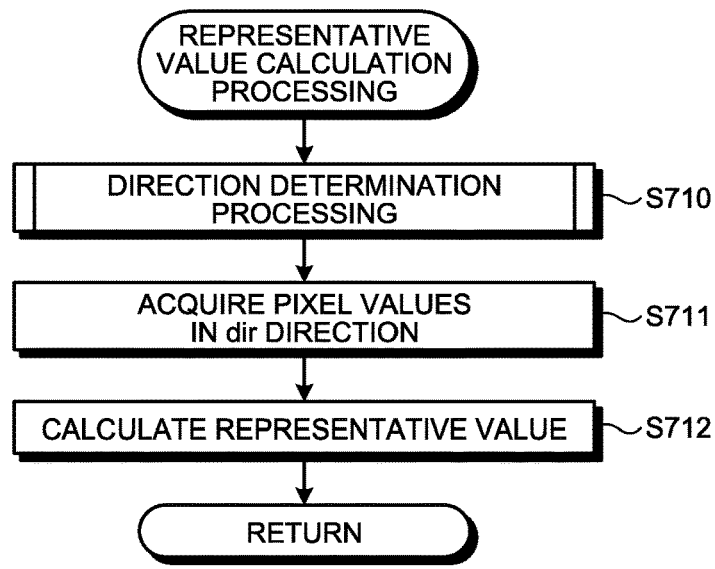
FIG. 21 is a flowchart illustrating overview of representative value calculation processing in FIG. 20.

FIG. 21 is a flowchart illustrating overview of the representative value calculation processing in step S704 in FIG. 20.

As illustrated in FIG. 21, the direction determination unit 274a first executes direction determination processing in a range centered on the pixel of interest (step S710). In this case, the direction determination unit 274a executes the direction determination processing of any of the aforementioned first embodiment and the second to fifth modified examples of the aforementioned first embodiment. Thus, detailed description of the direction determination processing will be omitted.

Subsequently, based on the direction determination result obtained by the direction determination unit 274a, the representative value decision unit 274b acquires pixel values in the dir direction obtained through the direction determination, from the RAW image stored in the volatile memory 111, via the second external I/F unit 21, the first external I/F unit 115, and the bus 113 (step S711). In addition, the representative value decision unit 274b stores all the acquired pixels values in the dir direction into the buffer 242 by copying the values in the variables P1 to P7.

After that, the representative value decision unit 274*b* calculates, as a representative value, an average value of the respective pixel values of the variables P1 to P7 stored in the buffer 242 (step S712). In this case, when any of the variables P1 to P7 is a pixel in which there is a possibility that RTS noise occurs, the representative value decision unit 274*b* may exclude a pixel value of the pixel in which there is a possibility that RTS noise occurs, and calculate, as a representative value, an average value of pixel values of the remaining pixels. In addition, in place of an average value, the representative value decision unit 274*b* may calculate, as a representative value, any of a weighted average, a mode value, and a median value of the respective pixel values of the variables P1 to P7. After step S712, the RTS noise correction unit 27 returns the processing to a main routine of FIG. 20.

Referring back to FIG. 20, the description subsequent to step S705 will be continued.

In step S705, based on the plurality of candidate values calculated by the candidate value calculation unit 272 in the aforementioned step S703, and the representative value calculated by the representative value calculation unit 274 in the aforementioned step S704, the correction value calculation unit 275 executes correction value calculation processing of calculating a pixel value of a RAW pixel in which RTS noise in the pixel of interest has been corrected.

Figure 22:
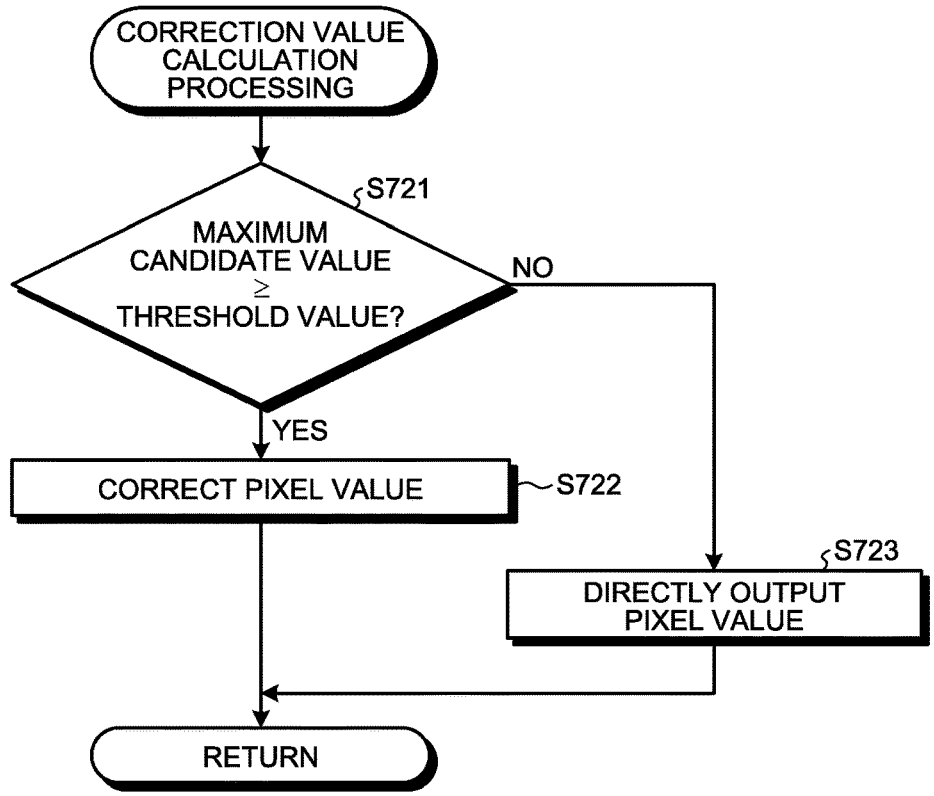
FIG. 22 is a flowchart illustrating overview of correction value calculation processing in FIG. 20.

FIG. 22 is a flowchart illustrating overview of the correction value calculation processing in step S705 in FIG. 20.

As illustrated in FIG. 22, based on a random noise amount surrounding the pixel of interest that has been estimated by the random noise amount estimation unit 273 (standard deviation in this second embodiment), and the maximum value of candidate values calculated by the candidate value calculation unit 272 in the aforementioned step S703 in FIG. 20, the correction value calculation unit 275 first determines whether the maximum value of the candidate values is equal to or larger than a threshold value (step S721). Here, the threshold value is set according to the following formula (1):

$$\text{random noise amount} \times Rm \quad (1).$$

Rm denotes a predetermined coefficient. In addition, Rm is decided according to the visuality degree of RTS noise with respect to random noise. For example, the value of Rm is preferably around 2. When the correction value calculation unit 275 determines that the maximum value of the candidate values is equal to or larger than the threshold value (step S721: Yes), the RTS noise correction unit 27 advances the processing to step S722 to be described later. In contrast to this, when the correction value calculation unit 275 determines that the maximum value of the candidate values is not equal to or larger than the threshold value (step S721: No), the RTS noise correction unit 27 advances the processing to step S723 to be described later. In addition, the correction value calculation unit 275 may use RTS_Value of the pixel of interest in place of the maximum value of the candidate values, and compare RTS_Value of the pixel of interest and the threshold value.

In step S722, the correction value calculation unit 275 corrects the pixel value. More specifically, the correction value calculation unit 275 first calculates Δ according to the following formula (2)

$$\Delta = \text{pixel value of pixel of interest in RAW image} - \text{representative value} \quad (2).$$

Next, the correction value calculation unit 275 compares an absolute value of Δ with one or more candidate values calculated by the candidate value calculation unit 272 in the aforementioned step S703 in FIG. 20, selects a candidate value closest to the absolute value of Δ, and sets the candidate value as δ. In addition, if there is a plurality of candidate values closest to the absolute value of Δ, the correction value calculation unit 275 selects, as δ, the smallest candidate value of the plurality of candidate value for preventing excess correction.

Lastly, the correction value calculation unit 275 corrects the pixel value of the pixel of interest in the RAW image by bringing the pixel value closer in the representative value direction by δ, according to the following formulae (3) and (4), and outputs the corrected pixel value of the pixel of interest to the basic image processor 28.

When Δ<0

$$\text{pixel value of pixel of interest in RAW image} + \delta \quad (3)$$

When Δ≥0, $$\text{pixel value of pixel of interest in RAW image} - \delta \quad (4)$$

After step S722, the RTS noise correction unit 27 returns the processing to the main routine of FIG. 20. In addition, in step S722, the correction value calculation unit 275 calculates Δ, and selects the smallest candidate value of the plurality of candidate values. Alternatively, the correction value calculation unit 275 may calculate values obtained by individually adding or subtracting each of the plurality of candidate values to or from the pixel value of the pixel of interest in the RAW image, and select the closest representative value among a plurality of added or subtracted values obtained by the calculation. In addition, in step S722, the correction value calculation unit 275 may use other calculation and comparison methods as long as the same result is obtained. Furthermore, the correction value calculation unit 275 executes processing equivalent to processing of calculating, as a corrected pixel value of the pixel of interest, a value obtained by clipping a representative value into a value equal to or larger than the pixel value of the pixel of interest in the RAW image−RTS_Value, and equal to or smaller than the pixel value of the pixel of interest in the RAW imag +RTS_Value.

In step S723, the correction value calculation unit 275 directly outputs the pixel value of the pixel of interest in the RAW image to the basic image processor 28. After step S723, the RTS noise correction unit 27 returns the processing to the main routine of FIG. 20.

Referring back to FIG. 20, the description subsequent to step S706 will be continued.

In step S706, the RTS noise correction unit 27 determines whether the processing in the aforementioned steps S701 to S705 has ended for all the pixels (step S706). When the RTS noise correction unit 27 determines that the aforementioned processing has ended for all the pixels (step S706: Yes), the RTS noise correction unit 27 ends this processing. In contrast to this, when the RTS noise correction unit 27 determines that the aforementioned processing has not ended for all the pixels (step S706: No), the RTS noise correction unit 27 returns the processing to the aforementioned step S701.

According to the above-described second embodiment of the present disclosure, direction determination may be accurately performed on image data. Thus, when noise reduction (e.g., isolated point reduction, blinking defective noise reduction, random noise reduction, etc.) of image data is performed, noise reduction may be performed so as to generate a high-quality image without feeling of strangeness at an edge portion or the like.

In addition, in the second embodiment of the present disclosure, isolated point reduction or blinking defective noise reduction is performed using a direction determination result. Similarly, the present disclosure may be applied to various types of noise reduction such as random noise reduction. In this case, various types of noise reduction such as random noise reduction are only required to be executed so as to increase correlation of a pixel value in a direction indicated by the direction determination result.

Third Embodiment

Next, a third embodiment of the present disclosure will be described. An imaging system according to this third embodiment differs from that according to the aforementioned second embodiment in the configuration of the imaging system 1a. More specifically, the imaging system according to this third embodiment differs from that according to the aforementioned first embodiment in the configuration of an image processing apparatus. Thus, a configuration of the imaging system according to this third embodiment will be described below. In addition, the same configurations as those in the imaging system 1 according to the aforementioned first embodiment are assigned the same sings, and the description thereof will be omitted.

Configuration of Imaging System

Figure 23:
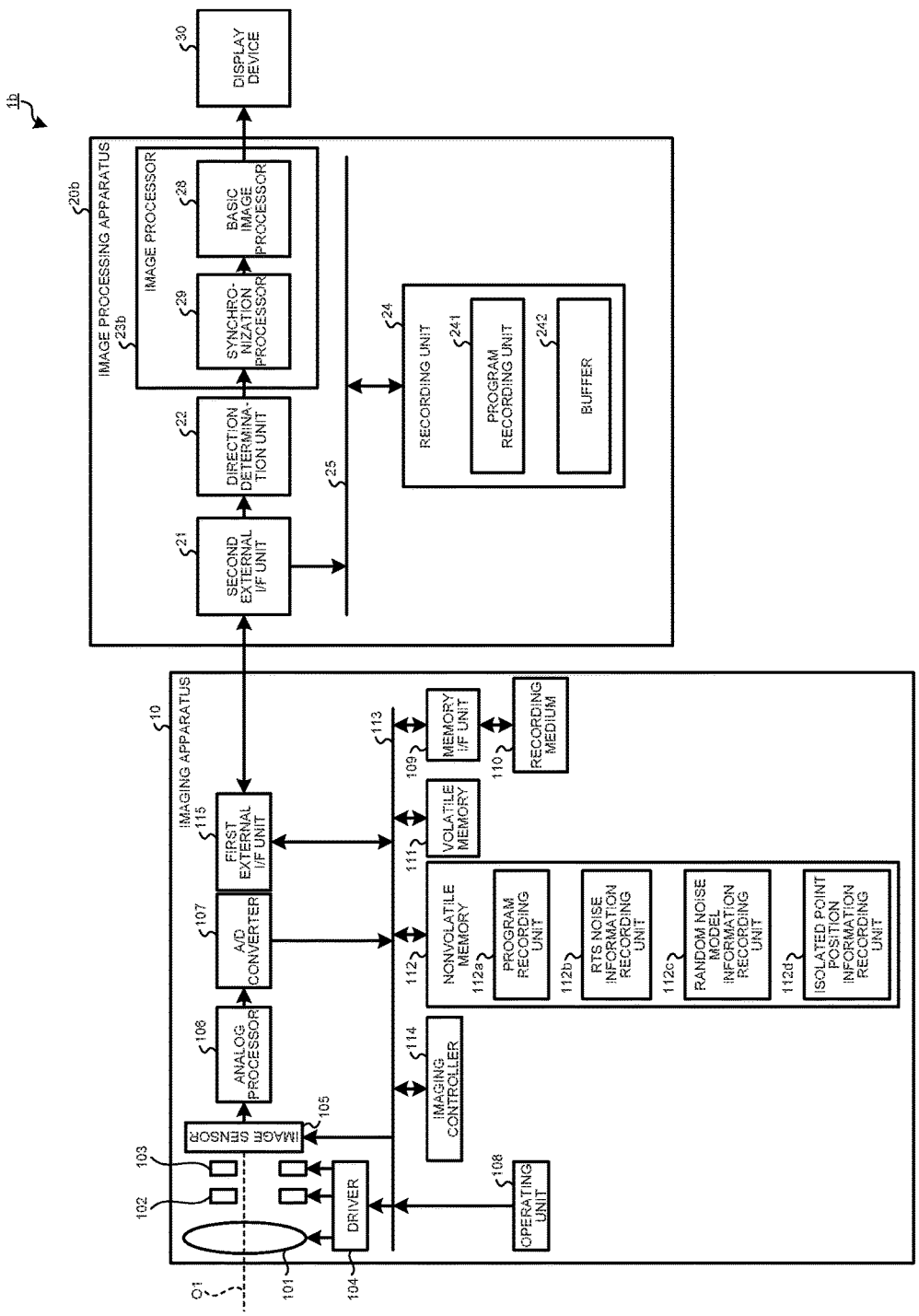
FIG. 23 is a block diagram schematically illustrating a configuration of an imaging system according to a third embodiment of the present disclosure.

FIG. 23 is a block diagram schematically illustrating a configuration of the imaging system according to the third embodiment of the present disclosure. An imaging system 1b illustrated in FIG. 23 includes an image processing apparatus 20b in place of the image processing apparatus 20a according to the aforementioned second embodiment.

Configuration of Image Processing Apparatus

A configuration of the image processing apparatus 20b will be described. The image processing apparatus 20b includes an image processor 23b in place of the image processor 23a according to the aforementioned second embodiment. The image processor 23b includes a synchronization processor 29 and the basic image processor 28.

Figure 24:
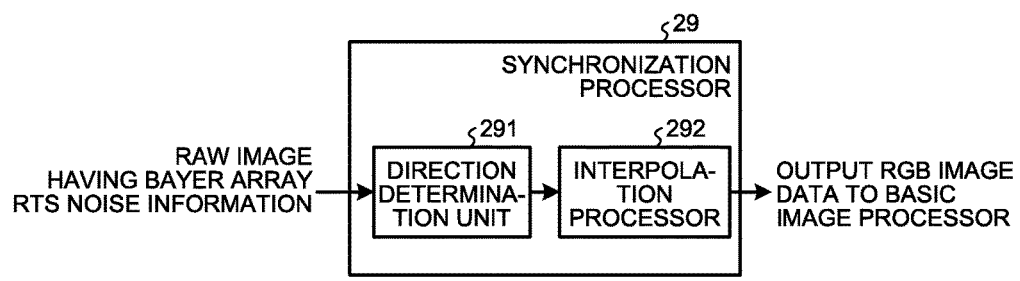
FIG. 24 is a block diagram illustrating a functional configuration of a synchronization processor according to the third embodiment of the present disclosure.

Based on a determination result determined by the direction determination unit 22 based on RTS noise information, the synchronization processor 29 converts a PAW image having the Bayer array, into RGB image data in which one pixel includes three components of RGB, and outputs the RGB image data to the basic image processor 28. Here, a detailed configuration of the synchronization processor 29 will be described. FIG. 24 is a block diagram illustrating a functional configuration of the synchronization processor 29. As illustrated in FIG. 24, the synchronization processor 29 includes a direction determination unit 291 and an interpolation processor 292.

The direction determination unit 291 has a function similar to that of the aforementioned the direction determination unit 22, and determines a direction in which correlation is the highest, in a pixel value of a pixel of interest in the RAW image and pixel values of neighboring pixels of the pixel of interest.

Based on the determination result of the direction determination unit 291, the interpolation processor 292 assumes that an edge continues in a direction of the direction determination result in the RAW image data, and interpolates colors other than the colors of the color filters of the pixel of interest, to generate an RGB image.

Processing of Synchronization Processor

Figure 25:
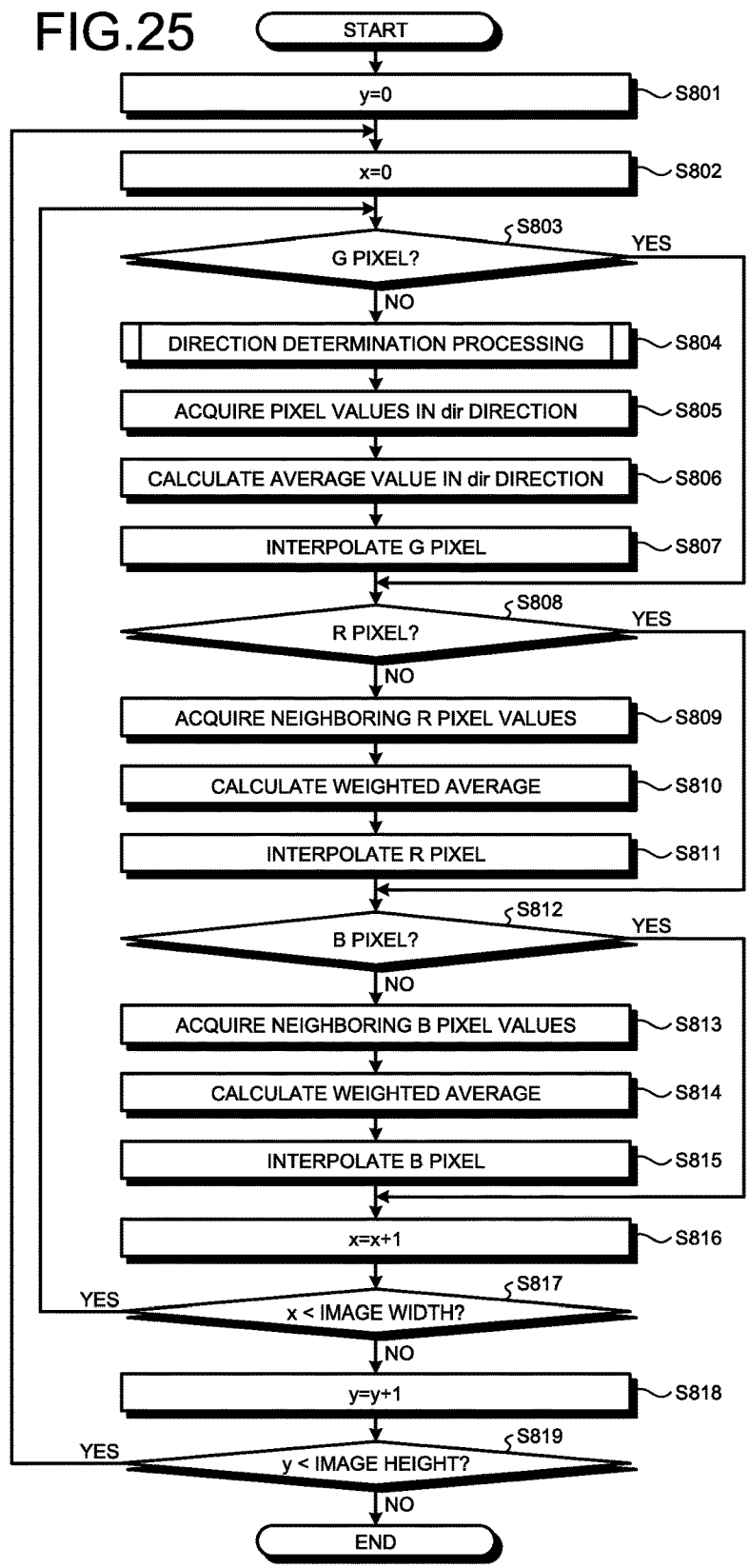
FIG. 25 is a flowchart illustrating overview of processing executed by the synchronization processor according to the third embodiment of the present disclosure.

Next, processing executed by the synchronization processor 29 will be described. FIG. 25 is a flowchart illustrating overview of processing executed by the synchronization processor 29, and is a flowchart illustrating overview of synchronization processing.

As illustrated in FIG. 25, the synchronization processor 29 first initializes a counter y indicating a position of a pixel in a height direction (longitudinal direction) of an image corresponding to image data stored in the buffer 242 of the recording unit 24 (y=0) (step S801), and initializes a counter x indicating a position of a pixel in a width direction (traverse direction) of an image corresponding to image data (x=0) (step S802).

Subsequently, when the pixel of interest in the coordinate (x, y) is a G pixel (step S803: Yes), the synchronization processor 29 advances the processing to step S808 to be described later. In contrast to this, when the pixel of interest in the coordinate (x, y) is not a G pixel (step S803: No), the synchronization processor 29 advances the processing to step S801 to be described later.

In step S804, the direction determination unit 291 executes the direction determination processing of any of the aforementioned first embodiment and the second to fifth modified examples of the aforementioned first embodiment. In this case, as illustrated in FIGS. 26A to 26F, the direction determination unit 291 performs direction determination processing using a pixel value of a pixel in which a color filter having the largest influence on resolution is arranged, such as, for example, a pixel value of a G pixel. In addition, when narrow band imaging (NBI) is performed, direction determination processing performed using a pixel in which a color filter having the largest influence on resolution is arranged, such as, for example, a B pixel. It should be appreciated that the direction determination unit 291 may perform direction determination processing using a pixel value of a G pixel, a pixel value of an R pixel in which an R filter is arranged, and a pixel value of a B pixel in which a B filter is arranged, similarly to the direction determination processing of any of the aforementioned first embodiment and the second to fifth modified examples of the aforementioned first embodiment. In addition, the direction determination processing executed by the direction determination unit 291 corresponds to the direction determination processing of any of the aforementioned first embodiment and the second to fifth modified examples of the aforementioned first embodiment. Thus, the description of the direction determination processing will be omitted in this third embodiment.

After that, based on the determination result of the direction determination unit 291, the interpolation processor 292 acquires all the pixel values in the dir direction determined by the direction determination unit 291, from the RAW image stored in the volatile memory 111, via the second external I/F unit 21, the first external I/F unit 115, and the bus 113 (step S805). In this case, the interpolation processor 292 stores the pixel values in the dir direction acquired from the volatile memory 111, into the buffer 242 by copying the values in the variables P1 to P7.

Subsequently, the interpolation processor 292 calculates an average value in the dir direction, using the respective pixel values of the variables P1 to P7 stored in the buffer 242 (step S806). In addition, in place of an average value, the interpolation processor 292 may calculate, as an average value in the dir direction, any of a weighted average, a mode value, and a median value of the variables P1 to P7.

After that, the interpolation processor 292 interpolates the average value calculated in step S806, as a G component in the coordinate (x, y) stored in the buffer 242 (step S807).

Subsequently, when the pixel of interest in the coordinate (x, y) is an R pixel (step S808: Yes), the synchronization processor 29 advances the processing to step S812 to be described later. In contrast to this, when the pixel of interest in the coordinate (x, y) is not an R pixel (step S808: No), the synchronization processor 29 advances the processing to step S809 to be described later.

In step S809, the interpolation processor 292 acquires, via the second external I/F unit 21, the first external I/F unit 115, and the bus 113, pixel values of R pixels surrounding the pixel of interest in the coordinate (x, y), from the RAW image stored in the volatile memory 111.

Subsequently, the interpolation processor 292 calculates a weighted average of the pixel values of R pixels surrounding the pixel of interest in the coordinate (x, y) that have been acquired in step S809 (step S810). In this case, the interpolation processor 292 calculates the weighted average by applying a filter of allocating a larger weight to a pixel value of an R pixel closer to the coordinate (x, y), to R pixels within 5×5 pixels.

After that, the interpolation processor 292 interpolates the weighted average calculated in step S810, as an R component in the coordinate (x, y) stored in the buffer 242 (step S811).

Subsequently, when the pixel of interest in the coordinate (x, y) is a B pixel (step S812: Yes), the synchronization processor 29 advances the processing to step S816 to be described later. In contrast to this, when the pixel of interest in the coordinate (x, y) is not a B pixel (step S812: No), the synchronization processor 29 advances the processing to step S813 to be described later.

In step S813, the interpolation processor 292 acquires, via the second external I/F unit 21, the first external I/F unit 115, and the bus 113, pixel values of B pixels surrounding the pixel of interest in the coordinate (x, y), from the RAW image stored in the volatile memory 111.

Subsequently, the interpolation processor 292 calculates a weighted average of the pixel values of B pixels surrounding the pixel of interest in the coordinate (x, y) that have been acquired in step S813 (step S814). In this case, the interpolation processor 292 calculates the weighted average by applying a filter of allocating a larger weight to a pixel value of a B pixel closer to the coordinate (x, y), to B pixels within 5×5 pixels.

After that, the interpolation processor 292 interpolates the weighted average calculated in step S814, as a B component in the coordinate (x, y) stored in the buffer 242 (step S815).

After that, the interpolation processor 292 increments the counter x (x=x+1) (step S816).

Subsequently, when the counter x is smaller than a width of an image corresponding to image data (step S817: Yes), the interpolation processor 292 returns the processing to step S803. In contrast to this, when the counter x is not smaller than a width of an image corresponding to image data (step S817: No), the interpolation processor 292 advances the processing to step S818.

Subsequently, the interpolation processor 292 increments the counter y (y=y+1) (step S318).

After that, when the counter y is smaller than a height of an image corresponding to image data (step S819: Yes), the interpolation processor 292 returns the processing to step S802. In contrast to this, when the counter y is not smaller than a height of an image corresponding to image data (step S819: No), the interpolation processor 292 ends this processing.

In addition, using any of the following methods, the basic image processor 28 may perform edge enhancement that is based on the direction determination result, on an edge component that is based on the direction determination result of the aforementioned synchronization processor 29, by performing addition to image data through coring processing or gain multiplication processing.

(Method 1)

A method 1 is a method in which the basic image processor 28 generates an edge component that is based on the direction determination result, by subtracting an image obtained by applying a lowpass filter to an RGB image, from an RGB image having been subjected to interpolation processing in the above processing.

(Method 2)

A method 2 is a method in which the basic image processor 28 generates an edge component that is based on the direction determination result, by extracting edge components in a plurality of directions by applying a filter (e.g., differentiation filter, etc.) that may extract edges in a plurality of directions, around a pixel of interest, and calculating an edge component in a direction intersecting with the direction determination result of the direction determination unit 291.

(Method 3)

A method 3 is a method in which the basic image processor 28 generates an edge component that is based on the direction determination result, by extracting edge components by applying a filter (e.g., Laplacian filter, etc.) that may extract edges in a plurality of directions, around a pixel of interest, and based on the direction determination result of the direction determination unit 291, performing smoothing in the direction.

In this manner, the basic image processor 28 performs edge enhancement that is based on the direction determination result, using the direction determination result of the aforementioned synchronization processor 29, and any of the aforementioned methods 1 to 3.

According to the above-described third embodiment of the present disclosure, direction determination may be accurately performed on image data in which blinking defective noise having pixel values varying within a certain range occurs, such as RTS noise. Thus, a high-resolution image may be generated by using the present disclosure for interpolation processing (synchronization processing, etc.) and edge extraction processing.

Fourth Embodiment

Next, a fourth embodiment of the present disclosure will be described. In the aforementioned first to third embodiments, the image processing apparatus is provided separately from the imaging apparatus. Nevertheless, in this fourth embodiment, an image processing apparatus is provided in an imaging apparatus main body. Thus, in the following description, the same configurations as those in the imaging systems according to the aforementioned first to third embodiments are assigned the same sings, and the description thereof will be omitted.

Configuration of Imaging System

Figure 27:
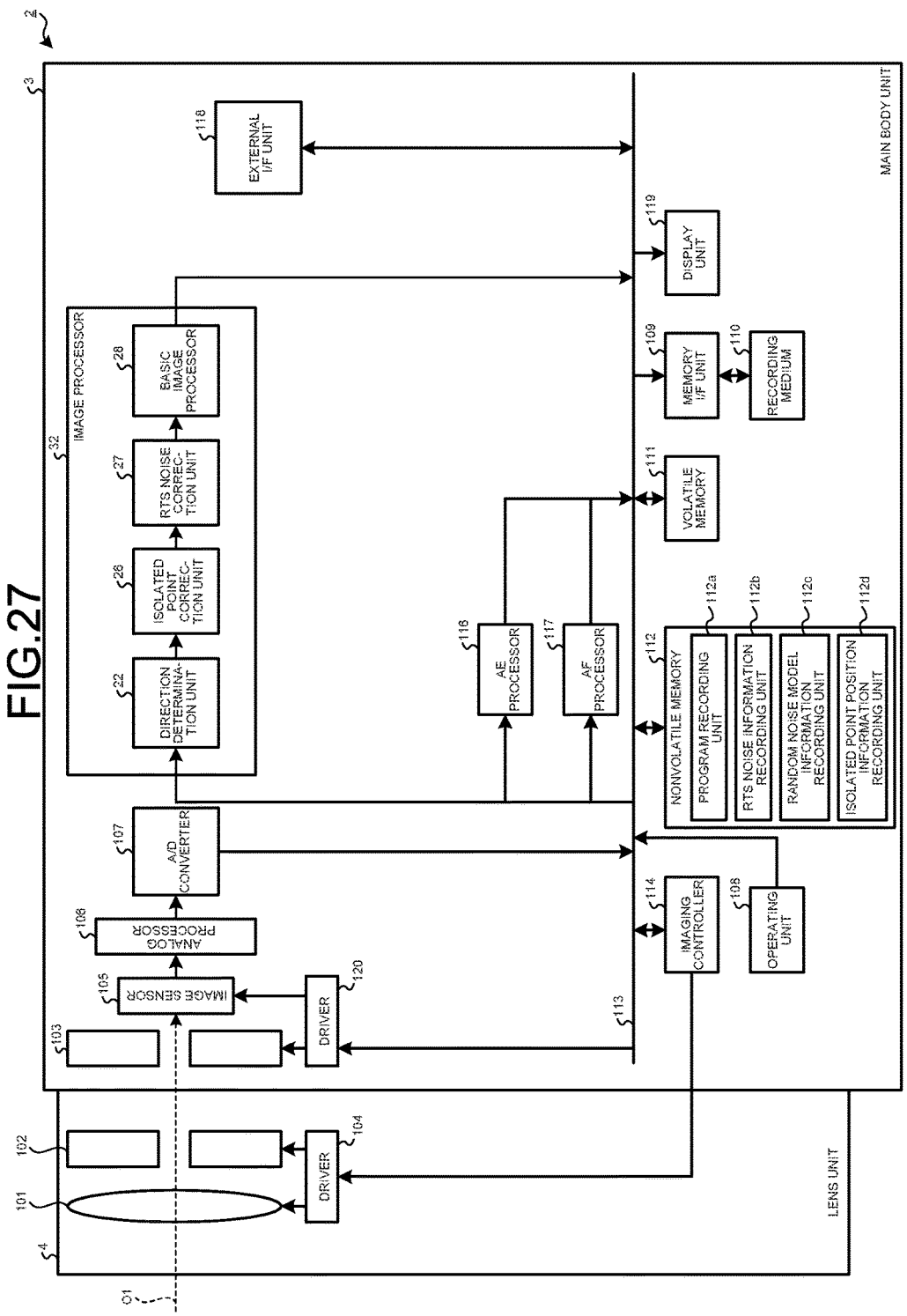
FIG. 27 is a block diagram schematically illustrating a configuration of an imaging system according to a fourth embodiment of the present disclosure.

FIG. 27 is a block diagram schematically illustrating a configuration of the imaging system according to the fourth embodiment of the present disclosure. An imaging system 2 illustrated in FIG. 27 includes a main body unit 3, and a lens unit 4 detachably-connectable to the main body unit 3.

Configuration of Main Body Unit

The main body unit 3 includes the shutter 103, the image sensor 105, the analog processor 106, the A/C converter 107, the operating unit 108, the memory I/F unit 109, the recording medium 110, the volatile memory 111, the nonvolatile memory 112, the bus 113, the imaging controller 114, an AE processor 116, an AF processor 117, an external I/F unit 118, a display unit 119, a driver 120, and an image processor 32. The driver 120 drives the shutter 103 under the control of the imaging controller 114.

The AE processor 116 acquires image data stored in the volatile memory 111, via the bus 113, and sets an exposure condition used in performing still image capturing or moving image capturing, based on the acquired image data. More specifically, the AE processor 116 calculates luminance from the image data, and performs automatic exposure (AutoExposure) of the imaging system 2 by deciding, for example, a diaphragm value, an exposure time, ISO sensitivity, and the like, based on the calculated luminance.

The AF processor 117 acquires the image data stored in the volatile memory 111, via the bus 113, and adjusts autofocus of the imaging system 2 based on the acquired image data. For example, the AF processor 117 extracts a signal having a high-frequency component, from the image data, and adjusts autofocus of the imaging system 2 by deciding focusing evaluation of the imaging system 2 by performing AutoFocus (AF) calculation processing on the signal having a high-frequency component. In addition, the autofocus adjustment method of the imaging system 2 may acquire a phase difference signal in the image sensor 105.

The external I/F unit 118 may perform, for example, reading and writing of data in various blocks in the main body unit 3, and control using a dedicated command or the like. The external I/F unit 118 is an interface that may control various blocks in the main body unit 3 by connecting to an external device such as a dedicated circuit and a personal computer (PC) on which an FPGA, a DSP, a GPU, or the like is mounted.

The display unit 119 is formed by using a display panel having a liquid crystal, organic Electro Luminescence (EL), or the like. The display unit 119 displays an image corresponding to image data generated by the image sensor 105.

The image processor 32 includes the direction determination unit 22, the isolated point correction unit 26, the RTS noise correction unit 27, and the basic image processor 28.

Configuration of Lens Unit

As illustrated in FIG. 27, the lens unit 4 forms a subject image condensed from a predetermined viewing field region, on the image sensor 105. The lens unit 4 includes the optical system 101 the diaphragm 102, and the driver 104.

Processing of Imaging System

Figure 28:
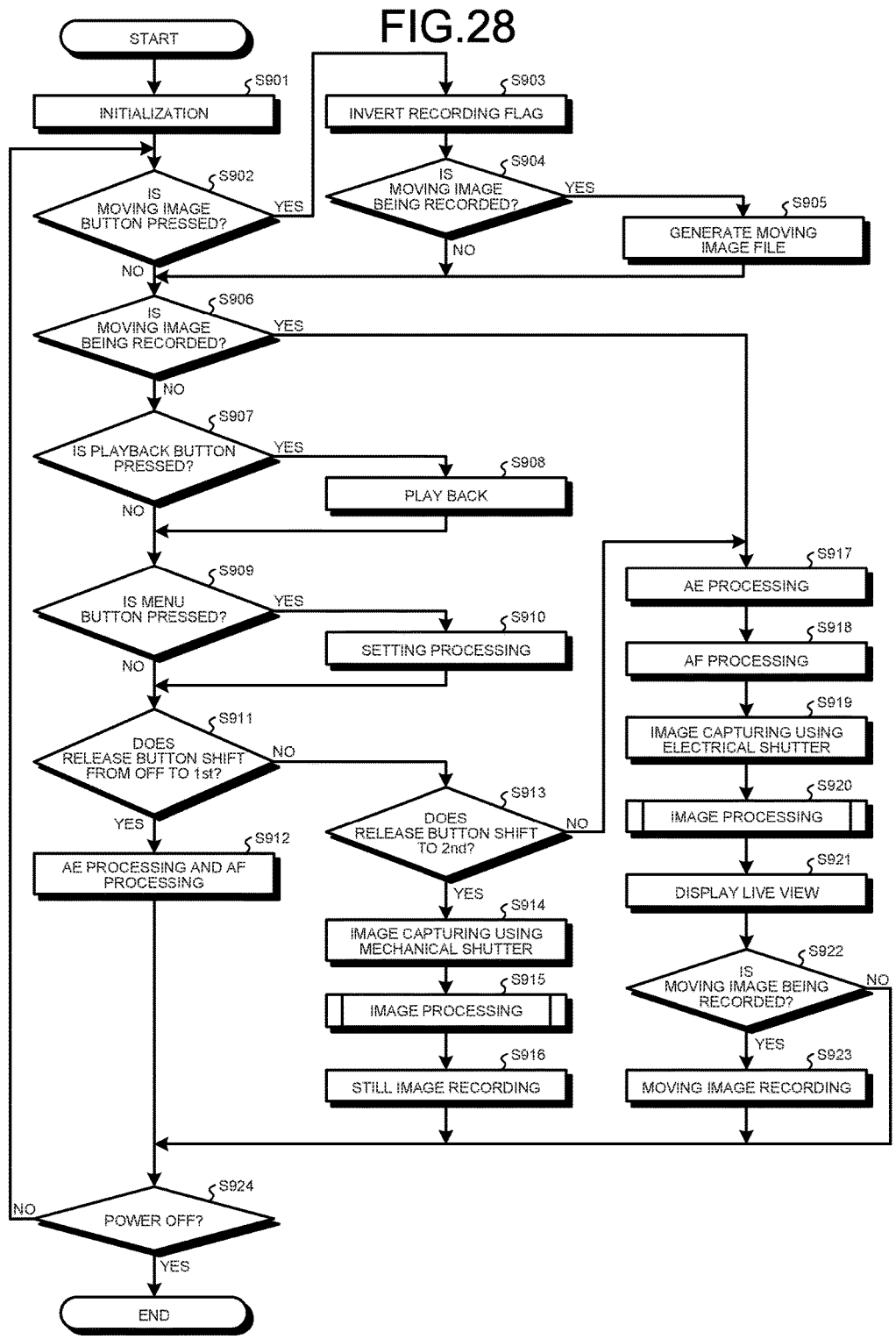
FIG. 28 is a flowchart illustrating overview of processing executed by the imaging system according to the fourth embodiment of the present disclosure.

Next, processing executed by the imaging system 2 will be described. FIG. 28 is a flowchart illustrating overview of processing executed by the imaging system 2.

As illustrated in FIG. 28, when a power button (not illustrated) of the operating unit 108 is operated by a user, and the power of the main body unit 3 is turned on, the imaging controller 114 first initializes the imaging system 2 (step S901). More specifically, the imaging controller 114 performs initialization of setting recording flag indicating that a moving image is being recorded, to an off state. The recording flag is a flag set to an on state during the capturing of a moving image, and set to the off state when a moving image is not being captured, and is stored in the volatile memory 111.

Subsequently, when a moving image button of the operating unit 108 is pressed (step S902: Yes), the imaging controller 114 inverts the recording flag in the on state that indicates that a moving image is being recorded (step S903), and the imaging controller 114 determines whether the imaging system 2 is recording a moving image (step S904). More specifically, the imaging controller 114 determines whether the recording flag stored in the volatile memory 111 is in the on state. When it is determined by the imaging controller 114 that the imaging system 2 is recording a moving image (step S904: Yes), the imaging system 2 advances the processing to step S905 to be described later. In contrast to this, when it is determined by the imaging controller 114 that the imaging system 2 is not recording a moving image (step S904: No), the imaging system 2 advances the processing to step S906 to be described later.

In step S905, the imaging controller 114 generates a moving image file for chronologically recording image data onto the recording medium 110. After step S905, the imaging system 2 advances the processing to step S906 to be described later.

When the moving image button of the operating unit 108 is not pressed in step S902 (step S902: No), the imaging system 2 advances the processing to step S906.

Subsequently, the imaging controller 114 determines whether the imaging system 2 is recording a moving image (step S906). When it is determined by the imaging controller 114 that the imaging system 2 is recording a moving image (step S906: Yes), the imaging system 2 advances the processing to step S917 to be described later. In contrast to this, when it is determined by the imaging controller 114 that a moving image is not being recorded (step S906: No), the imaging system 2 advances the processing to step S907 to be described later.

When a playback button of the operating unit 108 is pressed in step S907 (step S907: Yes), the imaging system 2 causes the display unit 119 to play back and display an image corresponding to image data recorded on the recording medium 110 (step S908). After step S908, the imaging system 2 advances the processing to step S909 to be described later.

When the playback button of the operating unit 108 is not pressed in step S907 (step S907: No), the imaging system 2 advances the processing to step S909.

Subsequently, when a menu button of the operating unit 108 is pressed (step S909: Yes), the imaging system 2 executes setting processing of performing various setting (step S910). After step S910, the imaging system 2 advances the processing to step S911 to be described later.

When the menu button of the operating unit 108 is not pressed in step S909 (step S909: No), the imaging system 2 advances the processing to step S911.

When a release button of the operating unit 108 shifts from the off state a 1st state in step S911 (step S911: Yes), the imaging controller 114 causes the AE processor 116 to execute the AE processing of adjusting exposure, and causes the AF processor 117 to execute the AF processing of adjusting focus (step S912). After that, the imaging system 2 advances the processing to step S924 to be described later.

When the release button of the operating unit 108 does not shift from the off state to the 1st state in step S911 (step S911: No), the imaging system 2 advances the processing to step S913.

Subsequently, when the release button of the operating unit 108 shifts to a 2nd state (step S913: Yes), the imaging controller 114 executes image capturing using a mechanical shutter (step S914). More specifically, the imaging controller 114 causes the image sensor 105 to execute image capturing, by controlling the shutter 103.

Subsequently, the image processor 32 executes image processing of performing direction determination on image data generated by the image sensor 105, correcting RTS noise, and then, performing predetermined processing (step S915). In addition, the details of the image processing will be described later.

After that, the imaging controller 114 records the image data on which the image processing has been performed by the image processor 32, onto the recording medium 110 (step S916). After step S916, the imaging system 2 advances the processing to step S924 to be described later.

When the release button of the operating unit 108 does not shift to the 2nd state in step S913 (step S913: No), the imaging system 2 advances the processing to step S917.

Subsequently, the imaging controller 114 causes the AE processor 116 to execute the AE processing of adjusting exposure (step S917), and causes the AF processor 117 to execute the AF processing of adjusting focus (step S918).

After that, the imaging controller 114 causes the image sensor 105 to execute so-called image capturing using an electrical shutter for electrically controlling an exposure time via the driver 120 (step S919). Image data generated by the image sensor 105 by the image capturing using the electrical shutter is output to the volatile memory 111 via the analog processor 106, the A/ID converter. 107, and the bus 113.

Subsequently, the image processor 32 executes image processing similar that in step S915 (step S920). In addition, the details of the image processing will be described later.

After that, the imaging system 2 causes the display unit 119 to display a live view image corresponding to the image data generated by the image sensor 105 by the image capturing using the electrical shutter (step S921).

Subsequently, when the imaging system 2 is recording a moving image (step S922: Yes), the imaging controller 114 causes an image compression expansion unit (not illustrated) to compress the image data in a recording format set in the setting processing in step S910, and records the compressed image data Into the moving image file created in the recording medium 110, as a moving image (step S923). After step S923, the imaging system 2 advances the processing to step S924.

When the imaging system 2 is not recording a moving image in step S922 (step S922: No), the imaging system 2 advances the processing to step S924.

Subsequently, when the power button of the operating unit 108 is pressed, and the power of the imaging system 2 is set to the off state (step S924: Yes), the imaging system 2 ends this processing. In contrast to this, when the power of the imaging system 2 is not in the off state (step S924: No), the imaging system 2 returns the processing to step S902.

Overview of Image Processing

Figure 29:
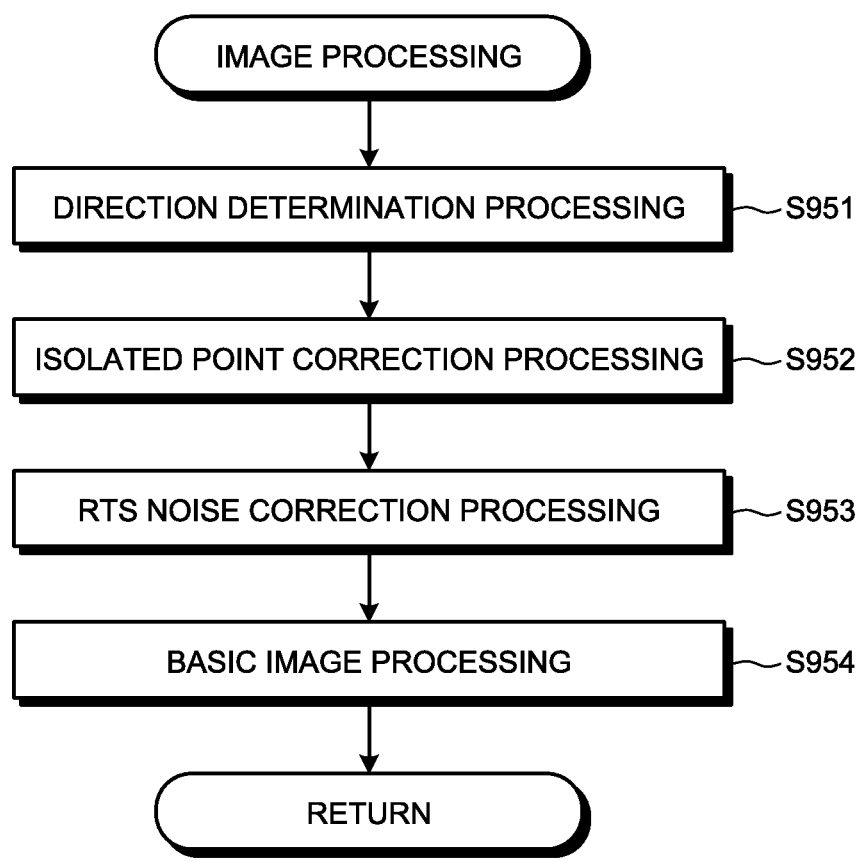
FIG. 29 is a flowchart illustrating overview of image processing in FIG. 28.

Next, die image processing described in steps S915 and S920 in FIG. 28 will be described. FIG. 29 is a flowchart illustrating overview of the image processing.

As illustrated in FIG. 29, die direction determination unit 22 first executes direction determination processing of determining an edge, on the image data generated by the image sensor 105 (step S951). Here, the direction determination processing corresponds to any of the direction determination processing executed by the direction determination unit 22 in the aforementioned first embodiment and the second to fifth modified examples of the aforementioned first embodiment. Thus, the description thereof will be omitted.

Subsequently, using the determination result determined by the direction determination unit 22, the isolated point correction unit 26 executes, on the image data, isolated point correction processing of correcting an isolated point in the image data (step S952). Here, the isolated point correction processing corresponds to the isolated point correction processing executed by the isolated point correction unit 26 in the aforementioned second embodiment. Thus, the description thereof will be omitted.

After that, the RTS noise correction unit 27 executes, on the image data, RTS noise correction processing of correcting RTS noise in the image data (step S953). Here, the RTS noise correction processing corresponds to the RTS noise correction processing executed by the RTS noise correction unit 27 in the aforementioned second embodiment. Thus, the description thereof will be omitted.

Subsequently, the basic image processor 28 executes basic image processing on the image data in which RTS noise has been corrected by the RTS noise correction unit 27 (step S954). After step S954, the imaging system 2 returns the processing to a main routine of FIG. 28.

According to the above-described fourth embodiment of the present disclosure, an effect similar to that in the aforementioned first embodiment is brought about, and edge direction determination may be accurately performed on image data in which blinking defective noise having values varying at random within a predetermined range occurs, such as RTS noise.

Other Embodiments

In the present disclosure, correction processing of correcting RTS noise, synchronization processing, isolated point correction processing of excluding an isolated point, and the like are performed based on the determination result of the direction determination unit. For example, noise reduction processing of suppressing or reducing noise included in image data, resizing processing of expanding or contracting an image, and the like may be performed based on the determination result of the direction determination unit.

In addition, in the present disclosure, the RTS noise information recording unit, the random noise model information recording unit, and the isolated point position information recording unit are provided in the imaging apparatus. Nevertheless, they may be provided in the aforementioned image processing apparatus. Alternatively, the RTS noise information recording unit, the random noise model information recording unit, and the isolated point position information recording unit may be provided in a server that may perform interactive communication via a network, so that the RTS noise information, the random noise model information, and the isolated point position information may he acquired via the network. In addition, when an image sensor is detachable, the RTS noise information recording unit, the random noise model information recording unit, and the isolated point position information recording unit may be provided in a detachable device including the image sensor.

The present disclosure is not limited to the aforementioned embodiments, and it should be appreciated that various modifications and applications may be made within the scope of the present disclosure. For example, in addition to The imaging apparatus used in the description of the present disclosure, the present disclosure may be applied to any device that may capture an image of a subject, such as an imaging apparatus that captures an image of a subject through an optical equipment. Examples of such an imaging apparatus include a portable device including an image sensor in a mobile phone and a smartphone, a video camera, an endoscope, a monitoring camera, and microscope.

In addition, the present disclosure may be applied to image data other than image data used for display or recording. For example, the present disclosure may be applied to image data such as image data in an OB region, or image data in a region outside an image circle having an optically-unassured design.

In addition, in this description, in the description of the aforementioned operation flowcharts, operations have been described using "first", "next", "subsequently", "after that", and the like for the sake of convenience. Nevertheless, these do not mean that the operations need to be executed in this order.

In addition, a method of each processing performed by the image processing apparatus in the aforementioned embodiments, that is, the processing illustrated in each flowchart may be stored as a program that may be executed by a control unit such as a CPU. In addition to this, die processing may be delivered with being stored in a storage medium of an external storage device such as a memory card (ROM card, RAM card, etc.), a magnetic disc (floppy disk, hard disc, etc.), an optical disk (CD-ROM, DVD, etc.), a semiconductor memory, and the like. In addition, the control unit such as a CPU may execute the aforementioned processing by reading a program stored in a storage medium of the external storage device, and an operation being controlled according to the read program.

In addition, the present disclosure is not limited to the aforementioned embodiments and the modified examples in an unchanged state. In a practical phase, the present disclosure may be embodied by modifying components without departing from the scope of the disclosure. In addition, various disclosures may be formed by appropriately combining a plurality of components disclosed in the aforementioned embodiments. For example, several components may be deleted from all the components described in the aforementioned embodiments and the modified examples. Furthermore, the components described in the embodiments and the modified examples may be appropriately combined.

The present disclosure brings about such an effect that edge direction determination may be accurately performed on image data in which blinking defective noise having values varying at random within a predetermined range occurs, such as RTS noise.

In addition, in the description or the drawings, a term described at least once with a different term having a broader sense or the same sense may be replaced with the different term in any location in the description or the drawings. In this manner, various modifications and applications may be made without departing from the scope of the disclosure.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for performing image processing on image data including blinking defective noise that has been generated by an image sensor including pixels arranged in a two-dimensional matrix, the pixels being configured to receive light from outside and to generate a signal according to a light receiving amount, and readout circuits configured to read out the signal as a pixel value, the image processing apparatus comprising:
    an acquisition unit configured to acquire noise information including position information of a pixel in which there is a possibility that blinking defective noise attributed to the readout circuit occurs;
    a direction determination unit configured to determine, based on the noise information acquired by the acquisition unit, and pixel values of neighboring pixels surrounding a pixel of interest in an image corresponding to the image data, a direction in which pixel values having highest correlation with a pixel value of the pixel of interest are consecutively arrayed; and
    an image processor configured to perform image processing on the image data based on a determination result of the direction determination unit.

2. The image processing apparatus according to claim 1, wherein the noise information includes information in which the position information and feature data related to the blinking defective noise attributed to the readout circuit are associated.

3. The image processing apparatus according to claim 2, wherein the direction determination unit determines the direction based on the feature data, the pixel value of the pixel of interest, and the pixel of the neighboring pixels.

4. The image processing apparatus according to claim 2, wherein the direction determination unit determines the direction using any one value of the pixel value of the pixel of interest, a value obtained by adding the feature data to the pixel value of the pixel of interest, and a value obtained by subtracting the feature data from the pixel value of the pixel of interest.

5. The image processing apparatus according to claim 1, wherein, in a case of determining correlation in each direction in the pixel of interest with respect to the image, the direction determination unit decides a standard pixel from the pixel of interest or the neighboring pixels, and when there is a possibility that the blinking defective noise occurs in the standard pixel, determines the direction by correcting pixel values of pixels other than the standard pixel using the feature data.

6. The image processing apparatus according to claim 1, wherein the feature data is any of a noise level of the blinking defective noise and a value calculated based on the noise level.

7. The image processing apparatus according to claim 1, wherein the direction determination unit determines the direction by excluding a pixel in which there is a possibility that the blinking defective noise occurs, based on the position information.

8. The image processing apparatus according to claim 1, wherein the image processor performs image processing of removing noise in the pixel value of the pixel of interest so as to increase correlation of a pixel value of a pixel in the direction determined by the direction determination unit.

9. The image processing apparatus according to claim 1, wherein the image processor performs image processing of removing the blinking defective noise in the pixel value of the pixel of interest so as to increase correlation of a pixel value of a pixel in the direction determined by the direction determination unit.

10. The image processing apparatus according to claim 9, wherein the noise information further includes isolated point position information of an isolated point in the image sensor, and
    wherein the image processor performs image processing of removing the blinking defective noise by excluding the isolated point in the direction, based on the isolated point position information.

11. The image processing apparatus according to claim 10, wherein the image processor corrects a pixel value of the isolated point using a pixel value of a pixel in the direction determined by the direction determination unit.

12. The image processing apparatus according to claim 1, wherein the image processor performs image processing of interpolating the pixel value of the pixel of interest by estimating the direction determined by the direction determination unit, as an edge.

13. The image processing apparatus according to claim 12, wherein the image processor performs synchronization processing of the image data based on a determination result of the direction determination unit.

14. An image processing method executed by an image processing apparatus for performing image processing on image data including blinking defective noise that has been generated by an image sensor including pixels arranged in a two-dimensional matrix, the pixels being configured to receive light from outside and to generate a signal according to a light receiving amount, and readout circuits configured to read out the signal as a pixel value, the image processing method comprising:
   acquiring noise information including position information of a pixel in which there is a possibility that blinking defective noise attributed to the readout circuit occurs;
   determining, based on the noise information acquired by the acquisition unit, and pixel values of neighboring pixels surrounding a pixel of interest in an image corresponding to the image data, a direction in which pixel values having highest correlation with a pixel value of the pixel of interest are consecutively arrayed; and
   performing image processing on the image data based on a determination result of the direction determination unit.

15. A non-transitory computer-readable recording medium with an executable program stored thereon, the program causing a processor of an image processing apparatus for performing image processing on image data including blinking defective noise that has been generated by an image sensor including pixels arranged in a two-dimensional matrix, the pixels being configured to receive light from outside and to generate a signal according to a light receiving amount, and readout circuits configured to read out the signal as a pixel value, to execute:
   acquiring noise information including position information of a pixel in which there is a possibility that blinking defective noise attributed to the readout circuit occurs;
   determining, based on the noise information acquired by the acquisition unit, and pixel values of neighboring pixels surrounding a pixel of interest in an image corresponding to the image data, a direction in which pixel values having highest correlation with a pixel value of the pixel of interest are consecutively arrayed; and
   performing image processing on the image data based on a determination result of the direction determination unit.

\* \* \* \* \*